US008068281B2

(12) United States Patent
Adachi et al.

(10) Patent No.: US 8,068,281 B2
(45) Date of Patent: *Nov. 29, 2011

(54) ZOOM LENS SYSTEM, INTERCHANGEABLE LENS APPARATUS AND CAMERA SYSTEM

(75) Inventors: Nobuyuki Adachi, Tokyo (JP); Tsuneo Uchida, Chiba (JP)

(73) Assignee: Panasonic Corporation, Osaka (JP)

( * ) Notice: Subject to any disclaimer, the term of this patent is extended or adjusted under 35 U.S.C. 154(b) by 268 days.

This patent is subject to a terminal disclaimer.

(21) Appl. No.: 12/416,691

(22) Filed: Apr. 1, 2009

(65) Prior Publication Data

US 2009/0251781 A1 Oct. 8, 2009

(30) Foreign Application Priority Data

Apr. 2, 2008 (JP) ................................ 2008-096640

(51) Int. Cl.
*G02B 27/64* (2006.01)
*G02B 15/14* (2006.01)

(52) U.S. Cl. ...................... 359/557; 359/676; 359/686

(58) Field of Classification Search .......... 359/554–557, 359/676–689
See application file for complete search history.

(56) References Cited

U.S. PATENT DOCUMENTS

| 5,579,171 | A | * | 11/1996 | Suzuki et al. | 359/687 |
| 5,748,383 | A | * | 5/1998 | Ohtake | 359/683 |
| 6,025,962 | A | * | 2/2000 | Suzuki | 359/766 |
| 6,055,114 | A | * | 4/2000 | Ohtake | 359/676 |
| 6,091,901 | A | * | 7/2000 | Ogawa | 396/55 |
| 6,392,816 | B1 | * | 5/2002 | Hamano | 359/683 |
| 7,221,517 | B2 | * | 5/2007 | Terada et al. | 359/682 |
| 7,796,344 | B2 | * | 9/2010 | Adachi et al. | 359/684 |
| 7,808,719 | B2 | * | 10/2010 | Adachi et al. | 359/684 |

FOREIGN PATENT DOCUMENTS

| JP | 05-224123 A | 9/1993 |
| JP | 06-123836 A | 5/1994 |
| JP | 06-130330 A | 5/1994 |
| JP | 06-337375 A | 12/1994 |
| JP | 11-202201 A | 7/1999 |

* cited by examiner

*Primary Examiner* — Thong Nguyen
(74) *Attorney, Agent, or Firm* — Pearne & Gordon LLP

(57) ABSTRACT

A zoom lens system is provided that includes a compactly constructed focusing lens unit and that has a suppressed change in the image magnification at the time of movement of a focusing lens unit. The zoom lens system according to the present invention, in order from an object side to an image side, comprises: a first lens unit having positive optical power; a second lens unit having negative optical power; and at least two subsequent lens units, wherein at the time of zooming, all lens units move in a direction along the optical axis so that intervals between the lens units vary, and at the time of focusing, a second most image-side lens unit moves in a direction along the optical axis.

7 Claims, 29 Drawing Sheets

ZOOM LENS SYSTEM, INTERCHANGEABLE LENS APPARATUS AND CAMERA SYSTEM

BACKGROUND OF THE INVENTION

1. Field of the Invention

The present invention relates to a zoom lens system and, in particular, to a zoom lens system suitable for an imaging lens system employed in an interchangeable lens apparatus in a so-called interchangeable-lens type digital camera system (simply referred to as a "camera system", in some cases hereinafter). Further, the present invention relates to an interchangeable lens apparatus and a camera system that employ this zoom lens system.

2. Description of the Background Art

The market is rapidly growing for interchangeable-lens type digital camera systems each including: a camera body employing an image sensor composed of a CCD (Charge Coupled Device), a CMOS (Complementary Metal-Oxide Semiconductor) or the like; and an interchangeable lens apparatus employing an imaging lens system for forming an optical image on the light acceptance surface of the image sensor, wherein the imaging lens system is attachable to and detachable from the camera body. As for the interchangeable lens apparatuses, those employing a zoom lens system capable of forming an optical image with variable magnification are widely favored.

Among zoom lens systems, in particular, telephoto-oriented zoom lens systems have a long focal length at a telephoto limit, and hence often have a long overall optical length (a distance from the top of the lens surface on the most object side to the image surface). Thus, a configuration is often employed wherein a lens unit having positive optical power is arranged on the most object side and a lens unit having negative optical power is arranged on the most image side so that the overall optical length at a telephoto limit is made shorter than the focal length at a telephoto limit.

In telephoto-oriented zoom lens systems, configurations have been proposed wherein the number of lens units is increased for the purpose of reducing various kinds of aberration. For example, a zoom lens system consisting of five lens units of positive, negative, negative, positive and negative has been proposed (e.g., Japanese Patent Publication No. 3134448 (Reference 1)). Further, in telephoto-oriented zoom lens systems, the long focal length at a telephoto limit easily enhances image blur in association with vibration. Thus, methods have been proposed that a part of lens units (an image blur compensation lens unit) is parallel-displaced in a direction perpendicular to the optical axis in accordance with a change in the orientation of the entire lens system (e.g., Japanese Laid-Open Patent Publication No. H6-123836 (Reference 2), Japanese Patent Publication No. 3395169 (Reference 3), Japanese Laid-Open Patent Publication No. H6-130330 (Reference 4) and Japanese Laid-Open Patent Publication No. H11-202201 (Reference 5)).

Each of the telephoto zoom lens systems described in References 2, 3, and 4 consists of five lens units of positive, negative, negative, positive and negative in order from the object side to the image side. The telephoto zoom lens system described in Reference 5 consists of five lens units of positive, negative, negative, positive and negative or alternatively positive, negative, positive, positive and negative in order from the object side to the image side. In each telephoto zoom lens system, one of the five lens units is parallel-displaced in a direction perpendicular to the optical axis so that image blur compensation is achieved. When the individual lens units are referred to as the first lens unit, the second lens unit, . . . , and the fifth lens unit in order from the object side to the image side, the third lens unit in the telephoto zoom lens system described in Reference 2 is parallel-displaced in a direction perpendicular to the optical axis. Similarly, the second lens unit in the telephoto zoom lens system described in Reference 3, the fourth lens unit of the telephoto zoom lens system described in Reference 4, and a part of the second lens unit of the telephoto zoom lens system described in Reference 5 are parallel-displaced in a direction perpendicular to the optical axis.

In focusing in a telephoto zoom lens, a method of moving the first lens unit located on the most object side has widely been employed. Nevertheless, this focusing method based on the movement of the first lens unit causes a problem in that high-speed auto-focusing cannot be achieved because of the largeness and heaviness of the first lens unit. For the purpose of resolving this problem, in the telephoto zoom lens system described in Reference 5, focusing from an infinite distance to a close distance is proposed to be achieved by moving the fourth lens unit in an optical axis direction.

In interchangeable-lens type digital camera systems, video image taking is also desired in addition to still image taking. However, in video image taking, auto-focusing needs to be performed continuously at a high speed.

In order that auto-focusing should be performed continuously at a high speed, for example, a method of repeating a series of the following operations: oscillating (wobbling) a part of lens units in the optical axis directions at a high speed so that a situation of "out-of-focus state->in-focus state->out-of-focus state" is obtained; detecting, from the output signal of the image sensor, signal components in a predetermined frequency band in a part of the image region so that an optimal position realizing the in-focus state is calculated for the focusing lens unit; and moving the focusing lens unit to the optimal position, may be adopted. In order that uneasiness such as flickers should be avoided, video displaying need be performed at a high rate of, for example, 30 frames per second. Thus, basically, image taking also need be performed at the same rate of 30 frames per second. Accordingly, in auto-focusing in video image taking, the focusing lens unit need be wobbled continuously at the high rate of 30 Hz.

When the above-mentioned wobbling is to be employed, it should be noted that the size of the image corresponding to a photographic object varies in association with wobbling. This variation is caused mainly by the fact that the movement of the focusing lens unit in the optical axis directions generates a change in the focal length of the entire lens system. Then, when a large change in the image taking magnification is generated in association with wobbling, uneasiness is caused.

When the above-mentioned facts are taken into consideration, in order that the outer diameter of the lens barrel should be reduced, the weight of the image blur compensation lens unit and the focusing lens unit need be reduced as light as possible. For this purpose, the outer diameters of the individual lens elements that constitute the image blur compensation lens unit and the focusing lens unit need be reduced as small as possible so that the weight of the individual lens units need be reduced as light as possible. In this view, the techniques in the above-mentioned references have problems individually.

For example, References 1 to 4 do not mention image blur compensation. Further, in the zoom lens system described in Reference 5, the fourth lens unit that moves at the time of focusing is also composed of three or four lens elements. Thus, the fourth lens unit is heavy. This causes a problem that a larger motor or actuator for moving the fourth lens unit is required.

SUMMARY OF THE INVENTION

The present invention has been devised in view of the above-mentioned problems. An object of the present invention is to provide: a zoom lens system having an image blur compensation function, satisfactory imaging characteristics, and a compact construction; and a camera system employing this zoom lens system.

The zoom lens system according to the present invention, in order from an object side to an image side, comprises: a first lens unit having positive optical power; a second lens unit having negative optical power; and at least two subsequent lens units. At the time of zooming, all lens units move in a direction along the optical axis so that intervals between the lens units vary. At the time of focusing, a second most image-side lens unit moves in a direction along the optical axis.

The interchangeable lens apparatus according to the present invention comprises: a zoom lens system described above; and a camera mount section connected to a camera body provided with an image sensor for receiving an optical image formed by the zoom lens system and then converting the optical image into an electric image signal.

The camera system according to the present invention comprises: an interchangeable lens apparatus that includes the zoom lens system described above; and a camera body that is connected to the interchangeable lens apparatus via a camera mount section in an attachable and detachable manner and that includes an image sensor for receiving an optical image formed by the zoom lens system and then converting the optical image into an electric image signal.

According to the present invention, a zoom lens system can be provided that includes a compactly constructed focusing lens unit and that has a suppressed change in the image magnification at the time of movement of a focusing lens unit; and an interchangeable lens apparatus and a camera system that employ this zoom lens system.

These and other objects, features, aspects and effects of the present invention will become clearer on the basis of the following detailed description with reference to the accompanying drawings.

DESCRIPTION OF THE PREFERRED EMBODIMENTS

Figure 1:
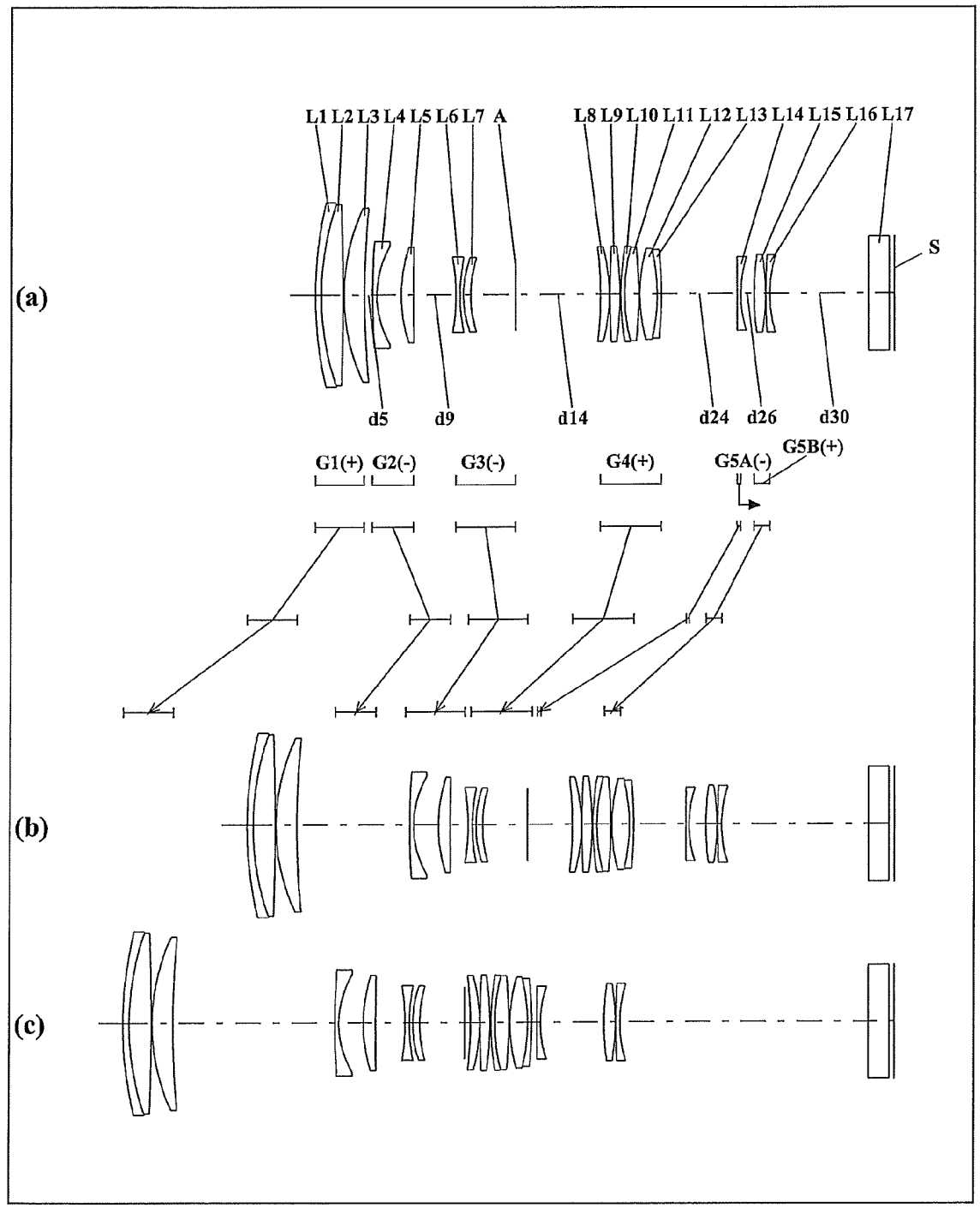
FIG. 1 is a lens arrangement diagram showing an infinity in-focus condition of a zoom lens system according to Embodiment 1 (Example 1)
Figure 2:
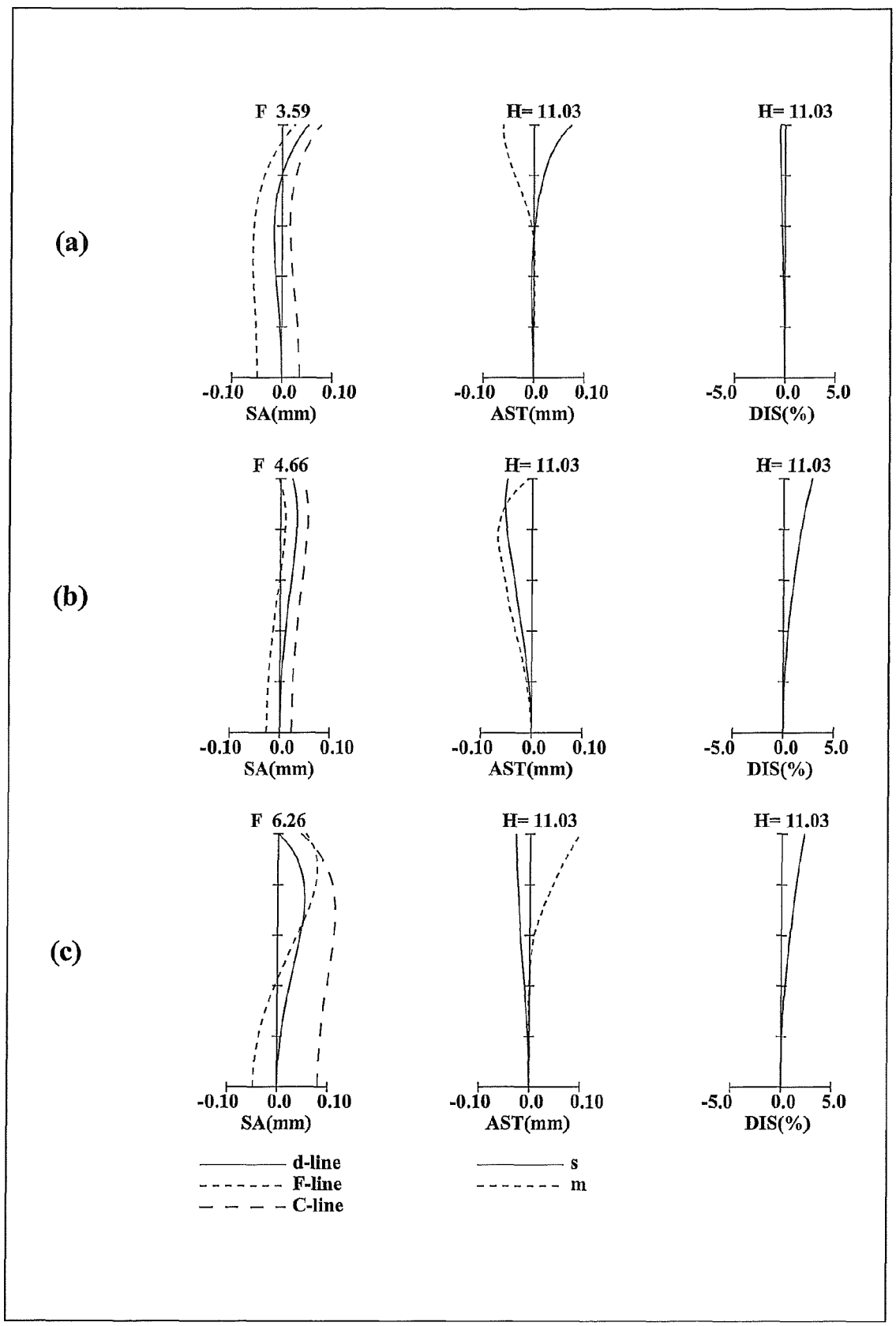
FIG. 2 is a longitudinal aberration diagram showing an infinity in-focus condition of a zoom lens system according to Example 1.
Figure 3:
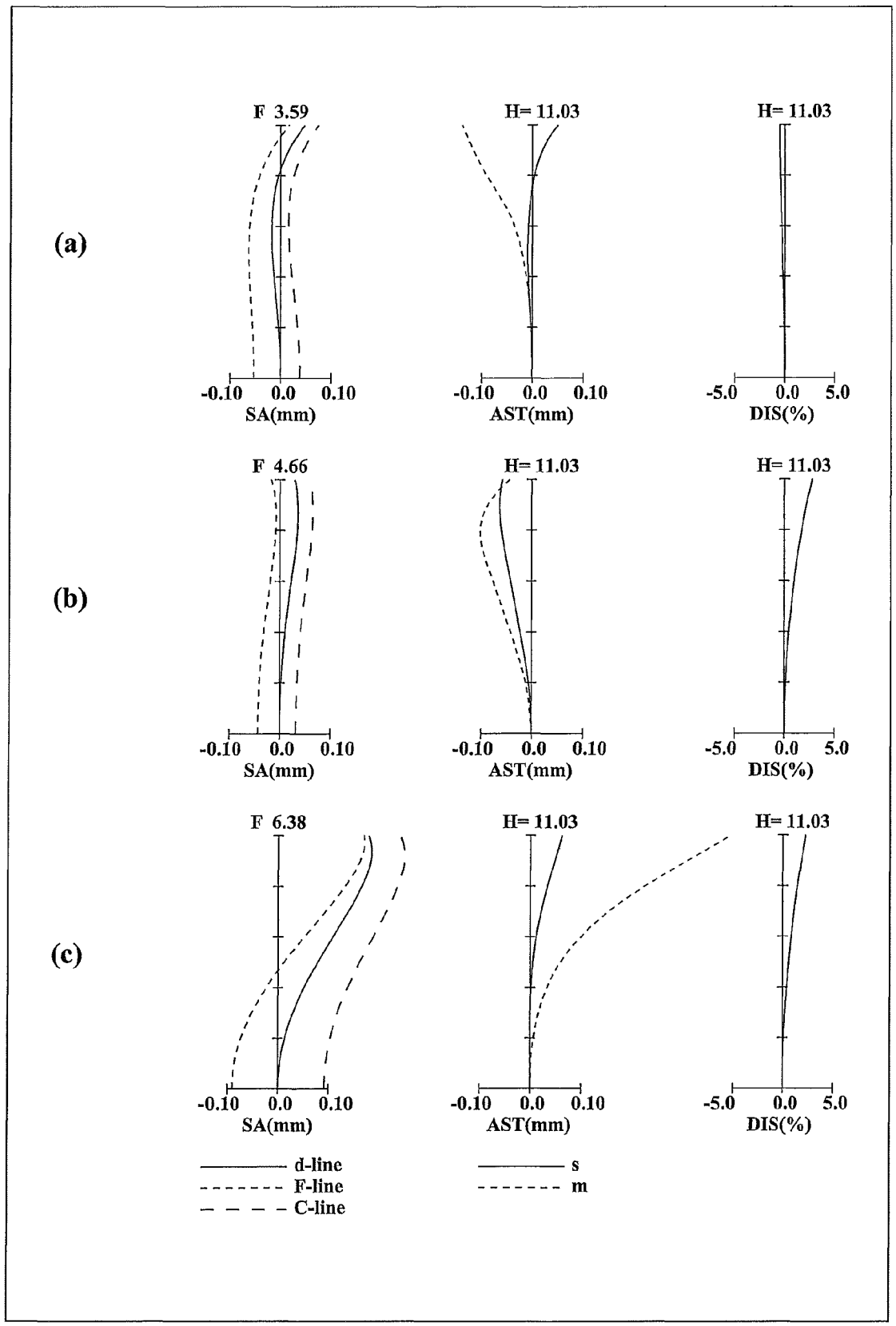
FIG. 3 is a longitudinal aberration diagram showing a close-point in-focus condition of a zoom lens system according to Example 1.
Figure 4:
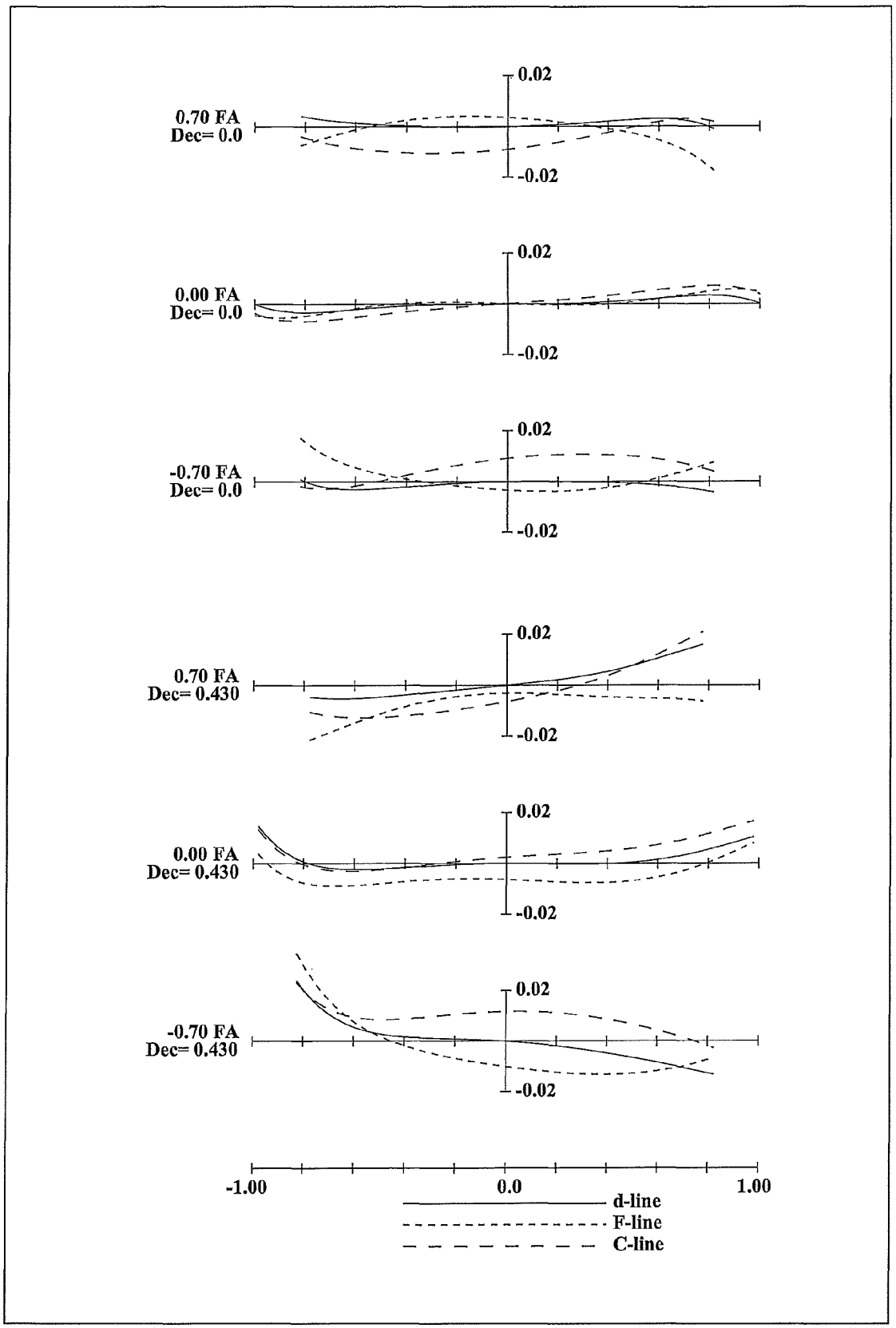
FIG. 4 is a lateral aberration diagram in a basic state where image blur compensation is not performed and in an image blur compensation state at a telephoto limit of a zoom lens system according to Example 1.

Each of FIGS. 1, 5, 9, 13, 17, 21 and 25 shows a zoom lens system in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W \cdot f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit. In the part between the wide-angle limit and the middle position and the part between the middle position and the telephoto limit, the positions are connected simply with a straight line, and hence this line does not indicate actual motion of each lens unit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

Further, in FIGS. 1, 5, 9, 13, 17, 21 and 25, an asterisk "*" imparted to a particular surface indicates that the surface is aspheric. In each Figure, symbol (+) or (−) imparted to the symbol of each lens unit corresponds to the sign of the optical power of the lens unit. Further, in each Figure, the straight line located on the most right-hand side indicates the position of the image surface S.

Embodiment 1

The zoom lens system according to Embodiment 1, in order from the object side to the image side, comprises a first lens unit G1 having positive optical power, a second lens unit G2 having negative optical power, a third lens unit G3 having negative optical power, a fourth lens unit G4 having positive optical power, a 5A-th lens unit G5A having negative optical power, and a 5B-th lens unit G5B having positive optical power.

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; and a positive meniscus fifth lens element L5 with the convex surface facing the object side.

The third lens unit G3 comprises: a bi-concave sixth lens element L6; and a positive meniscus seventh lens element L7 with the convex surface facing the object side.

The fourth lens unit G4 comprises: a positive meniscus eighth lens element L8 with the concave surface facing the object side; a bi-convex ninth lens element L9; a negative meniscus tenth lens element L10 with the convex surface facing the object side; a bi-convex eleventh lens element L11; a bi-convex twelfth lens element L12; and a negative meniscus thirteenth lens element L13 with the concave surface facing the object side. The tenth lens element L10 and the eleventh lens element L11 are cemented with each other. Further, the twelfth lens element L12 and the thirteenth lens element L13 are cemented with each other. The 5A-th lens unit G5A is composed of a negative meniscus fourteenth lens element L14 with the concave surface facing the image side.

The 5B-th lens unit G5B comprises: a bi-convex fifteenth lens element L15; and a negative meniscus sixteenth lens element L16 with the convex surface facing the object side.

At the time of zooming from a wide-angle limit to a telephoto limit, the individual lens units move in a direction along the optical axis.

An aperture diaphragm A is arranged between the third lens unit G3 and the fourth lens unit G4, and moves together with the third lens unit G3.

Further, at the time of focusing from an infinity in-focus condition to a close-point in-focus condition, the 5A-th lens unit G5A moves to the image side along the optical axis.

Further, for the purpose of compensation of image blur caused by vibration applied to the entire system, the third lens unit G3 moves in a direction perpendicular to the optical axis.

Here, the planar plate L17 arranged on the most image side corresponds to a low-pass filter or a face plate.

Embodiment 2

The zoom lens system according to Embodiment 2, in order from the object side to the image side, comprises a first lens unit G1 having positive optical power, a second lens unit G2 having negative optical power, a third lens unit G3 having negative optical power, a fourth lens unit G4 having positive optical power, a 5A-th lens unit G5A having negative optical power, and a 5B-th lens unit G5B having positive optical power.

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. The first lens element L1 and the second lens element L2 are cemented with each other.

The second lens unit G2, in order from the object side to the image side, comprises a bi-concave fourth lens element L4 and a bi-convex fifth lens element L5.

The third lens unit G3 comprises: a bi-concave sixth lens element L6; and a positive meniscus seventh lens element L7 with the convex surface facing the object side.

The fourth lens unit G4 comprises: a positive meniscus eighth lens element L8 with the concave surface facing the object side; a bi-convex ninth lens element L9; a negative meniscus tenth lens element L10 with the convex surface facing the object side; a bi-convex eleventh lens element L11; and a bi-convex twelfth lens element L12.

The 5A-th lens unit G5A is composed of a bi-concave thirteenth lens element L13.

The 5B-th lens unit G5B is composed of a positive meniscus fourteenth lens element L14 with the convex surface facing the object side.

At the time of zooming from a wide-angle limit to a telephoto limit, the individual lens units move in a direction along the optical axis.

An aperture diaphragm A is arranged between the third lens unit G3 and the fourth lens unit G4, and moves together with the third lens unit G3.

Further, at the time of focusing from an infinity in-focus condition to a close-point in-focus condition, the 5A-th lens unit G5A moves to the image side along the optical axis.

Further, for the purpose of compensation of image blur caused by vibration applied to the entire system, the third lens unit G3 moves in a direction perpendicular to the optical axis.

Here, the planar plate L15 arranged on the most image side corresponds to a low-pass filter or a face plate.

Embodiment 3

The zoom lens system according to Embodiment 3, in order from the object side to the image side, comprises a first lens unit G1 having positive optical power, a second lens unit G2 having negative optical power, a third lens unit G3 having negative optical power, a fourth lens unit G4 having positive optical power, a 5A-th lens unit G5A having positive optical power, and a 5B-th lens unit G5B having negative optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises a bi-concave fourth lens element L4 and a bi-convex fifth lens element L5.

The third lens unit G3 comprises: a bi-concave sixth lens element L6; and a positive meniscus seventh lens element L7 with the convex surface facing the object side. The sixth lens element L6 and the seventh lens element L7 are cemented with each other.

The fourth lens unit G4 comprises: a bi-convex eighth lens element L8; a bi-convex ninth lens element L9; and a negative meniscus tenth lens element L10 with the concave surface facing the object side. The ninth lens element L9 and the tenth lens element L10 are cemented with each other.

The 5A-th lens unit G5A comprises: a positive meniscus eleventh lens element L11 with the concave surface facing the object side; and a bi-convex twelfth lens element L12.

The 5B-th lens unit G5B is composed of a negative meniscus thirteenth lens element L13 with the convex surface facing the object side.

At the time of zooming from a wide-angle limit to a telephoto limit, the individual lens units move in a direction along the optical axis.

An aperture diaphragm A is arranged between the third lens unit G3 and the fourth lens unit G4, and moves together with the third lens unit G3.

Further, at the time of focusing from an infinity in-focus condition to a close-point in-focus condition, the 5A-th lens unit G5A moves to the object side along the optical axis. Further, for the purpose of compensation of image blur caused by vibration applied to the entire system, the third lens unit G3 moves in a direction perpendicular to the optical axis.

Here, the planar plate L14 arranged on the most image side corresponds to a low-pass filter or a face plate.

Embodiment 4

The zoom lens system according to Embodiment 4, in order from the object side to the image side, comprises a first lens unit G1 having positive optical power, a second lens unit G2 having negative optical power, a third lens unit G3 having positive optical power, a fourth lens unit G4 having positive optical power, and a fifth lens unit G5 having negative optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a bi-concave fourth lens element L4; a positive meniscus fifth lens element L5 with the convex surface facing the object side; a bi-concave sixth lens element L6; and a positive meniscus seventh lens element L7 with the convex surface facing the object side. The fourth lens element L4 and the fifth lens element L5 are cemented with each other. The sixth lens element L6 and the seventh lens element L7 are cemented with each other.

The third lens unit G3 comprises: a bi-convex eighth lens element L8; a bi-convex ninth lens element L9; and a negative meniscus tenth lens element L10 with the concave surface facing the object side. The ninth lens element L9 and the tenth lens element L10 are cemented with each other.

The fourth lens unit G4 comprises a bi-convex eleventh lens element L11 and a bi-convex twelfth lens element L12.

The fifth lens unit G5 is composed of a bi-concave thirteenth lens element L13.

At the time of zooming from a wide-angle limit to a telephoto limit, the individual lens units move in a direction along the optical axis.

An aperture diaphragm A is arranged between the second lens unit G2 and the third lens unit G3, and moves together with the third lens unit G3.

Further, at the time of focusing from an infinity in-focus condition to a close-point in-focus condition, the fourth lens unit G4 moves to the object side along the optical axis.

Further, for the purpose of compensation of image blur caused by vibration applied to the entire system, a cemented lens element constructed by cementing the sixth lens element L6 and the seventh lens element L7 in the second lens unit G2 with each other moves in a direction perpendicular to the optical axis.

Here, the planar plate L14 arranged on the most image side corresponds to a low-pass filter or a face plate.

Embodiment 5

The zoom lens system according to Embodiment 5, in order from the object side to the image side, comprises a first lens unit G1 having positive optical power, a second lens unit G2 having negative optical power, a third lens unit G3 having positive optical power, a 4A-th lens unit G4A having negative optical power, and a 4B-th lens unit G4B having positive optical power.

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a positive meniscus fifth lens element L5 with the convex surface facing the object side; a bi-concave sixth lens element L6; and a positive meniscus seventh lens element L7 with the convex surface facing the object side.

The third lens unit G3 comprises: a positive meniscus eighth lens element L8 with the convex surface facing the image side; a positive meniscus ninth lens element L9 with the convex surface facing the image side; a negative meniscus tenth lens element L10 with the convex surface facing the object side; a bi-convex eleventh lens element L11; a bi-convex twelfth lens element L12; and a negative meniscus thirteenth lens element L13 with the convex surface facing the image side. The tenth lens element L10 and the eleventh lens element L11 are cemented with each other. Further, the twelfth lens element L12 and the thirteenth lens element L13 are cemented with each other.

The 4A-th lens unit G4A is composed of a bi-concave fourteenth lens element L14.

The 4B-th lens unit G4B comprises: a bi-convex fifteenth lens element L15; and a sixteenth lens element L16 with the convex surface facing the object side.

At the time of zooming from a wide-angle limit to a telephoto limit, the individual lens units move in a direction along the optical axis.

An aperture diaphragm A is arranged between the second lens unit G2 and the third lens unit G3, and moves together with the second lens unit G2.

Further, at the time of focusing from an infinity in-focus condition to a close-point in-focus condition, the 4A-th lens unit G4A moves to the image side along the optical axis.

Further, for the purpose of compensation of image blur caused by vibration applied to the entire system, the sixth lens element L6 and the seventh lens element L7 in the second lens unit G2 move in a direction perpendicular to the optical axis.

Here, the planar plate L17 arranged on the most image side corresponds to a low-pass filter or a face plate.

Embodiment 6

The zoom lens system according to Embodiment 6, in order from the object side to the image side, comprises a first lens unit G1 having positive optical power, a second lens unit G2 having negative optical power, a third lens unit G3 having positive optical power, a fourth lens unit G4 having positive optical power, and a fifth lens unit G5 having negative optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a bi-concave fourth lens element L4; a bi-convex fifth lens element L5; a bi-concave sixth lens element L6; and a positive meniscus seventh lens element L7 with the convex surface facing the object side. The fourth lens element L4 and the fifth lens element L5 are cemented with each other. The sixth lens element L6 and the seventh lens element L7 are cemented with each other.

The third lens unit G3 comprises: a bi-convex eighth lens element L8; a bi-convex ninth lens element L9; and a negative meniscus tenth lens element L10 with the convex surface facing the object side. The ninth lens element L9 and the tenth lens element L10 are cemented with each other.

The fourth lens unit G4 comprises: a positive meniscus eleventh lens element L11 with the concave surface facing the object side; a negative meniscus twelfth lens element L12 with the convex surface facing the image side; and a bi-convex thirteenth lens element L13. The eleventh lens element L11 and the twelfth lens element L12 are cemented with each other.

The fifth lens unit G5 is composed of a bi-concave fourteenth lens element L14.

At the time of zooming from a wide-angle limit to a telephoto limit, the individual lens units move in a direction along the optical axis.

An aperture diaphragm A is arranged between the second lens unit G2 and the third lens unit G3, and moves together with the third lens unit G3.

Further, at the time of focusing from an infinity in-focus condition to a close-point in-focus condition, the fourth lens unit G4 moves to the object side along the optical axis.

Further, for the purpose of compensation of image blur caused by vibration applied to the entire system, a cemented lens element constructed by cementing the sixth lens element L6 and the seventh lens element L7 in the second lens unit G2 with each other moves in a direction perpendicular to the optical axis.

Here, the planar plate L15 arranged on the most image side corresponds to a low-pass filter or a face plate.

Embodiment 7

The zoom lens system according to Embodiment 7, in order from the object side to the image side, comprises a first lens unit G1 having positive optical power, a second lens unit G2 having negative optical power, a third lens unit G3 having negative optical power, a fourth lens unit G4 having positive optical power, a 5A-th lens unit G5A having negative optical power, and a 5B-th lens unit G5B having negative optical power.

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. The first lens element L1 and the second lens element L2 are cemented with each other.

The second lens unit G2, in order from the object side to the image side, comprises: a fourth lens element L4 with the convex surface facing the object side; a bi-concave fifth lens element L5; and a positive meniscus sixth lens element L6 with the convex surface facing the object side.

The third lens unit G3, in order from the object side to the image side, comprises: a positive meniscus seventh lens element L7 with the concave surface facing the object side; a bi-concave eighth lens element L8; and a positive meniscus ninth lens element L9 with the convex surface facing the object side. The eighth lens element L8 and the ninth lens element L9 are cemented with each other.

The fourth lens unit G4, in order from the object side to the image side, comprises: a bi-convex tenth lens element L10; a bi-convex eleventh lens element L11; a bi-concave twelfth lens element L12; a bi-convex thirteenth lens element L13; a negative meniscus fourteenth lens element L14 with the convex surface facing the object side; and a bi-convex fifteenth lens element L15. The fourteenth lens element L14 and the fifteenth lens element L15 are cemented with each other.

The 5A-th lens unit G5A, in order from the object side to the image side, comprises: a positive meniscus sixteenth lens element L16 with the concave surface facing the object side; and a bi-concave seventeenth lens element L17 with the convex surface facing the image side. The sixteenth lens element L16 and the seventeenth lens element L17 are cemented with each other.

The 5B-th lens unit G5B, in order from the object side to the image side, comprises: a bi-convex eighteenth lens element L18; a negative meniscus nineteenth lens element L19 with the convex surface facing the image side; and a positive meniscus twentieth lens element L20 with the convex surface facing the object side.

At the time of zooming from a wide-angle limit to a telephoto limit, the individual lens units move in a direction along the optical axis.

An aperture diaphragm A is arranged between the third lens unit G3 and the fourth lens unit G4, and moves together with the fourth lens unit G4.

Further, at the time of focusing from an infinity in-focus condition to a close-point in-focus condition, the fifth lens unit G5 moves to the image side along the optical axis.

Further, for the purpose of compensation of image blur caused by vibration applied to the entire system, the third lens unit G3 moves in a direction perpendicular to the optical axis.

Here, the planar plate L21 arranged on the most image side corresponds to a low-pass filter or a face plate.

The following description is given for conditions to be satisfied by the zoom lens system according to each embodiment. Here, in the zoom lens system according to each embodiment, a plurality of conditions to be satisfied are set forth. Thus, a configuration of a zoom lens system that satisfies as many applicable conditions as possible is most preferable. However, when an individual condition is satisfied, a zoom lens system having the corresponding effect can be obtained.

Among the zoom lens systems according to the individual embodiments, in telephoto-oriented zoom lens systems that have a configuration that the focusing lens unit is not located on the most image side, it is preferable that the following condition is satisfied.

$$0.10 < |f_{BAK}/f_F|/(f_T/f_W) < 15.0 \quad (1)$$

(here, $f_T/f_W > 4$, $\omega_w < 20°$)
where,
$f_{BAK}$ is a composite focal length of the lens units arranged on the image side relative to the focusing lens unit at a wide-angle limit,
$f_F$ is a focal length of the focusing lens unit,
$f_T$ is a focal length of the entire system at a telephoto limit,
$f_W$ is a focal length of the entire system at a wide-angle limit, and
$\omega_w$ is a half view angle at a wide-angle limit.

The condition (1) relates to the focal lengths of the focusing lens unit and the subsequent lens units. When the value exceeds the upper limit of the condition (1), the focal length of the lens units arranged on the image side relative to the focusing lens unit becomes shorter in comparison with that of the focusing lens unit. This causes difficulty in compensating, by the subsequent lens units, aberration fluctuation generated in association with focusing. Thus, this situation is unpreferable. In contrast, when the value goes below the lower limit of the condition (1), the focal length of the lens units arranged on the image side relative to the focusing lens unit becomes excessively great. This causes an increase in the overall length, and hence causes difficulty in realizing a compact zoom lens system.

Among the zoom lens systems according to the individual embodiments, in telephoto-oriented zoom lens systems that have a configuration that the focusing lens unit is not located on the most image side, it is preferable that the following condition is satisfied.

$$0.10 \text{ mm}^{-1} < |f_{BAK}/f_F|/f_W < 15.0 \text{ mm}^{-1} \quad (2)$$

(here, $f_T/f_W > 4$)

where,
$f_{BAK}$ is a composite focal length of the lens units arranged on the image side relative to the focusing lens unit at a wide-angle limit,
$f_F$ is a focal length of the focusing lens unit, and
$f_W$ is a focal length of the entire system at a wide-angle limit.

The condition (2) relates to the focal lengths of the focusing lens unit and the subsequent lens units. When the value exceeds the upper limit of the condition (2), the focal length of the lens units arranged on the image side relative to the focusing lens unit becomes shorter in comparison with that of the focusing lens unit. This causes difficulty in compensating, by the subsequent lens units, aberration fluctuation generated in association with focusing. Thus, this situation is unpreferable. In contrast, when the value goes below the lower limit of the condition (2), the focal length of the lens units arranged on the image side relative to the focusing lens unit becomes excessively great. This causes an increase in the overall length, and hence causes difficulty in realizing a compact zoom lens system.

As in the zoom lens systems according to the individual embodiments, when the image blur compensation lens unit is located on the object side relative to the focusing lens unit, it is preferable that the following condition is satisfied.

$$0.3 < |f_F/f_{of}| < 6.0 \quad (3)$$

where,
$f_F$ is a focal length of the focusing lens unit, and
$f_{of}$ is a composite focal length of the lens units located within a range from the image blur compensation lens unit to the focusing lens unit at a wide-angle limit.

The condition (3) relates to the focal lengths of the image blur compensation lens unit and the focusing lens unit. When the value exceeds the upper limit of the condition (3), the focal length of the image blur compensation lens unit becomes excessively small. This causes difficulty in compensating off-axial aberration generated in association with image blur compensation. Thus, this situation is unpreferable. In contrast, when the value goes below the lower limit of the condition (3), the focal length of the focusing lens unit becomes short. At the same time, aberration fluctuation at the time of focusing increases. This causes difficulty in compensation.

As in the zoom lens systems according to the individual embodiments, when the image blur compensation lens unit is located on the object side relative to the focusing lens unit, it is preferable that the following condition is satisfied.

$$0.5 < |f_o/f_W| < 2.8 \quad (4)$$

(here, $f_T/f_W > 4$)
where,
$f_o$ is a focal length of the image blur compensation lens unit,
$f_T$ is a focal length of the entire system at a telephoto limit, and
$f_W$ is a focal length of the entire system at a wide-angle limit.

The condition (4) sets forth the focal length of the image blur compensation lens unit. When the value exceeds the upper limit of the condition (4), the focal length of the image blur compensation lens unit becomes short. This causes difficulty in compensating, by the subsequent lens units, off-axial aberration fluctuation generated in association with image blur compensation. Thus, this situation is unpreferable. In contrast, when the value goes below the lower limit of the condition (4), the focal length of the image blur compensation lens unit becomes excessively long. Thus, the movement of lens units at the time of image blur compensation becomes large. Accordingly, this situation is unpreferable.

Here, the individual lens units in each embodiment are composed exclusively of refractive type lens elements that deflect incident light by refraction (that is, lens elements of a type in which deflection is achieved at the interface between media each having a distinct refractive index). However, the present invention is not limited to this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Embodiment 8

Figure 29:
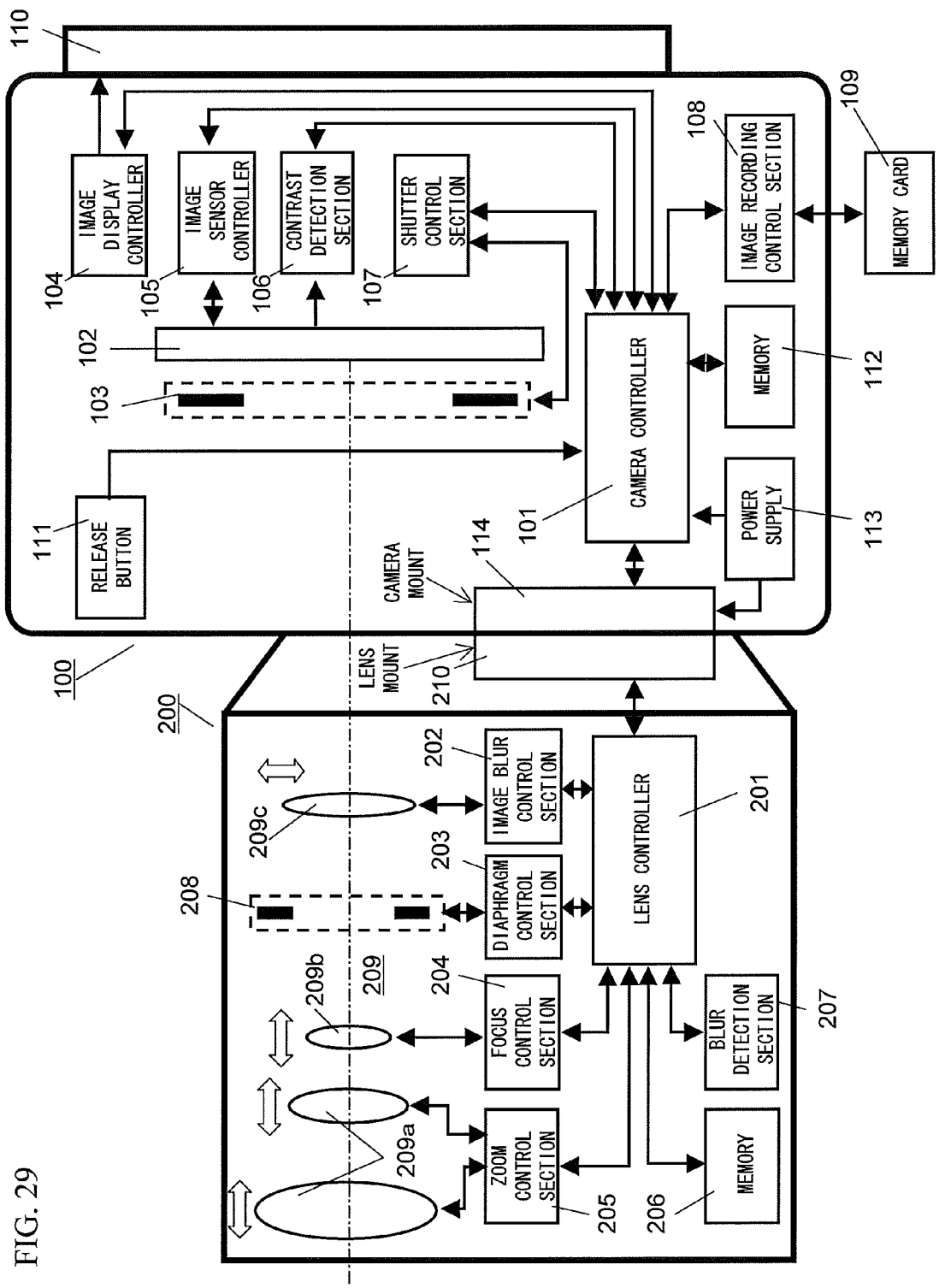
FIG. 29 is a block diagram of a camera system according to Embodiment 8.

FIG. 29 is a block diagram of a camera system according to Embodiment 8. The camera system according to Embodiment 8 includes a camera body 100 and an interchangeable lens apparatus 200.

The camera body 100 includes a camera controller 101, an image sensor 102, a shutter unit 103, an image display controller 104, an image sensor control section 105, a contrast detection section 106, a shutter control section 107, an image recording control section 108, a display 110, a release button 111, a memory 112, a power supply 113 and a camera mount 114.

The camera controller 101 is an arithmetic operation unit for controlling the entire camera system. The camera controller 101 is electrically connected to the image display controller 104, the image sensor control section 105, the contrast detection section 106, the shutter control section 107, the image recording control section 108, the memory 112 and the camera mount 114, and can exchange signals with these sections. Further, the camera controller 101 is electrically connected to the release button 111, and receives a signal generated at the time of operation of the release button 111. Moreover, the camera controller 101 is connected to the power supply 113.

The image sensor 102 is composed, for example, of a CMOS sensor. The image sensor 102 converts an optical image incident on the light receiving plane into image data, and then outputs the image data. The image sensor 102 is driven in accordance with a driving signal from the image sensor control section 105. In response to a control signal from the camera controller 101, the image sensor control section 105 outputs a driving signal for driving the image sensor 102, and then outputs to the camera controller 101 the image data outputted from the image sensor 102. In response to a control signal from the camera controller 101, the contrast detection section 106 calculates and detects the contrast of the image data outputted from the image sensor 102, and then outputs the result to the camera controller 101.

The shutter unit 103 includes a shutter plate for shutting off the optical path for the image light to be incident on the image sensor 102. The shutter unit 103 is driven in accordance with a driving signal from the shutter control section 107. In response to a control signal from the camera controller 101, the shutter control section 107 controls the opening or closing timing for the shutter plate of the shutter unit 103.

The display 110 is composed, for example, of a liquid crystal display unit. The display 110 is driven in accordance with a driving signal from the image display controller 104 so as to display an image on the display surface. In response to a control signal from the camera controller 101, the image display controller 104 outputs image data to be displayed on the display 110 and a driving signal for driving the display 110.

In response to a control signal from the camera controller 101, the image recording control section 108 outputs image data to a memory card 109 connected in an attachable and removable manner.

The camera mount 114 mechanically connects the camera body 100 to the interchangeable lens apparatus 200 described later. Further, the camera mount 114 serves also as an interface for electrically connecting the camera body 100 to the interchangeable lens apparatus 200 described later.

The interchangeable lens apparatus 200 includes a lens controller 201, an image blur control section 202, a diaphragm control section 203, a focus control section 204, a zoom control section 205, a memory 206, a blur detection section 207, a diaphragm unit 208, a zoom lens system 209 (a zoom lens unit 209$a$, a focusing lens unit 209$b$ and an image blur compensation lens unit 209$c$), and a lens mount 210.

The lens controller 201 is an arithmetic operation unit for controlling the entirety of the interchangeable lens apparatus 200, and is connected through the lens mount 210 and the camera mount 114 to the camera controller 101 in the camera body described above. The lens controller 201 is electrically connected to the image blur control section 202, the diaphragm control section 203, the focus control section 204, the zoom control section 205, the memory 206 and the blur detection section 207, and can exchange signals with these sections.

The zoom lens system 209 is a zoom lens system according to Embodiment 1 described above. The zoom lens system 209 includes a zoom lens unit 209$a$, a focusing lens unit 209$b$, and an image blur compensation lens unit 209$c$. Here, the classification of the zoom lens unit 209$a$, the focusing lens unit 209$b$ and the image blur compensation lens unit 209$c$ is merely conceptual and adopted for simplicity of description. Thus, this classification does not exactly describe the actual construction of the actual zoom lens system. In the zoom lens system 209, zooming is achieved when the zoom lens unit 209$a$ moves in a direction along the optical axis. In the zoom lens system 209, focusing is achieved when the focusing lens unit 209$b$ moves in a direction along the optical axis. Further, in the zoom lens system 209, image blur compensation is achieved when the image blur compensation lens unit 209$c$ moves in a direction perpendicular to the optical axis.

In response to a control signal from the lens controller 201, the image blur control section 202 detects and outputs the present position of the image blur compensation lens unit 209$c$. Further, the image blur control section 202 outputs a driving signal for driving the image blur compensation lens unit 209$c$, so as to drive the image blur compensation lens unit 209$c$ in a direction perpendicular to the optical axis.

In response to a control signal from the lens controller 201, the diaphragm control section 203 detects and outputs the present position of the diaphragm unit 208. Further, the diaphragm control section 203 outputs a driving signal for driving the diaphragm blades provided in the diaphragm unit 208, and thereby opens or closes the diaphragm so as to change the F-number of the optical system.

In response to a control signal from the lens controller 201, the focus control section 204 detects and outputs the present position of the focusing lens unit 209$b$. Further, the focus control section 204 outputs a driving signal for driving focusing group 209$b$, so as to drive the focusing lens unit 209$b$ in a direction along the optical axis.

In response to a control signal from the lens controller 201, the zoom control section 205 detects and outputs the present position of the zoom lens unit 209a. Further, the zoom control section 205 outputs a driving signal for driving the zoom lens unit 209a, so as to drive the zoom lens unit 209a in a direction along the optical axis.

In the above-mentioned configuration, when the release button 111 is pressed half, the camera controller 101 executes a routine of auto-focusing. First, the camera controller 101 communicates with the lens controller 201 via the camera mount 114 and the lens mount 210, so as to detect the state of the zoom lens unit 209a, the focusing lens unit 209b, the image blur compensation lens unit 209c and the diaphragm unit 208.

Then, the camera controller 101 communicates with the lens controller 201 via the camera mount 114 and the lens mount 210, so as to output to the lens controller 201a control signal for driving and wobbling the focusing lens unit 209b. In accordance with the control signal, the lens controller 201 controls the focus control section 204 so as to drive and wobble the focusing lens unit 209b. At the same time, the camera controller 101 communicates with the lens controller 201 via the camera mount 114 and the lens mount 210, so as to output a control signal for instructing the lens controller 201 to adjust the aperture value into a predetermined value. In accordance with the control signal, the lens controller 201 controls the diaphragm control section 203 so as to drive the diaphragm blades of the diaphragm unit 208 in correspondence to the predetermined F-number.

On the other hand, the camera controller 101 outputs a control signal to the image sensor control section 105 and the contrast detection section 106. The image sensor control section 105 and the contrast detection section 106 individually acquire an output from the image sensor 102 in a manner corresponding to the sampling frequency of the wobbling drive of the focusing lens unit 209b. In accordance with the control signal from the camera controller 101, the image sensor control section 105 transmits image data corresponding to the optical image to the camera controller 101. The camera controller 101 performs predetermined image processing onto the image data, and then transmits the result to the image display controller 104. The image display controller 104 displays the image data in the form of a visible image onto the display 110.

Further, the contrast detection section 106 calculates the contrast value of the image data in association with wobbling, and then transmits the result to the camera controller 101. On the basis of the detection result from the contrast detection section 106, the camera controller 101 determines the direction of focusing movement and the amount of movement for the focusing lens unit, and then transmits the information thereof to the lens controller 201. The lens controller 201 outputs a control signal to the focus control section 204 so as to move the focusing lens unit 209b. In accordance with the control signal from the lens controller 201, the focus control section 204 drives the focusing lens unit 209b.

When auto-focusing is to be performed in a live view state, the above-mentioned operation is repeated. When auto-focusing is to be performed in a live view state, wobbling of the focusing lens unit 209b is performed continuously. At that time, the zoom lens system according to each embodiment has merely a small image magnification change in association with wobbling, and has a light weight. Thus, an imaging lens system suitable for the above-mentioned system is obtained.

Embodiment 8 given above has been described for a case in which the zoom lens system according to Embodiment 1 is employed. However, obviously, a zoom lens system according to another embodiment may be employed.

EXAMPLES

Numerical examples are described below in which the zoom lens systems according to Embodiments 1 to 7 are implemented. As described later, Numerical Examples 1 to 7 correspond to Embodiments 1 to 7, respectively. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with "*" are aspheric surfaces, and the aspheric surface configuration is defined by the following expression.

$$Z = \frac{h^2/r}{1 + \sqrt{1 - (1+\kappa)(h/r)^2}} + \sum A_n h^n$$

Here, the symbols in the formula indicate the following quantities.

Z is the distance from an on-the-aspheric-surface point at a height h relative to the optical axis to a tangential plane at the top of the aspheric surface, h is the height relative to the optical axis, r is the radius of curvature at the top, κ is the conic constant, and An is the n-th order aspherical coefficient.

FIGS. 2, 6, 10, 14, 18, 22 and 26 are longitudinal aberration diagrams of an infinity in-focus condition of the zoom lens systems according to Numerical Examples 1, 2, 3, 4, 5, 6 and 7.

FIGS. 3, 7, 11, 15, 19, 23 and 27 are longitudinal aberration diagrams of a close-point in-focus condition of the zoom lens systems according to Numerical Examples 1, 2, 3, 4, 5, 6 and 7.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Figure, indicated as F), and the solid line, the short dash line and the long dash line indicate the characteristics to the d-line, the F-line and the C-line, respectively. In each astigmatism diagram, the vertical axis indicates the image height (in each Figure, indicated as H), and the solid line and the dash line indicate the characteristics to the sagittal image plane (in each Figure, indicated as "s") and the meridional image plane (in each Figure, indicated as "m"), respectively. In each distortion diagram, the vertical axis indicates the image height (in each Figure, indicated as H).

In each numerical example, as seen from the longitudinal aberration diagram of an infinity in-focus condition and the longitudinal aberration diagram of a close-point in-focus condition, also in a close-point in-focus condition, each zoom lens system achieves satisfactory aberration performance similar to that in an infinity in-focus condition.

FIGS. 4, 8, 12, 16, 20, 24 and 28 are lateral aberration diagrams in a basic state where image blur compensation is not performed and in an image blur compensation state of a zoom lens system according to Numerical Examples 1, 2, 3, 4, 5, 6 and 7.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensation lens unit moves by a predetermined amount in a direction perpendicular to the optical axis at a telephoto limit. Among the lateral aberration diagrams of a basic state, the upper part shows the lateral aberration at an image point of 75% of the maximum image height, the middle part shows the lateral aberration at the axial image point, and the lower part shows the lateral aberration at an image point of −75% of the maximum image height. Among the lateral aberration diagrams of an image blur compensation state, the upper part shows the lateral aberration at an image point of 75% of the maximum image height, the middle part shows the lateral aberration at the axial image point, and the lower part shows the lateral aberration at an image point of −75% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional image plane is adopted as the plane containing the optical axis of the first lens unit G1.

Here, in the zoom lens system according to each numerical example, the amount ($Y_T$) of movement of the compensation lens unit in a direction perpendicular to the optical axis in an image blur compensation state at a telephoto limit is as follows.

TABLE 1

(amount of movement of compensation lens unit)

| Numerical Example | $Y_T$ |
|---|---|
| 1 | 0.43 |
| 2 | 0.43 |
| 3 | 0.45 |
| 4 | 0.31 |
| 5 | 0.45 |
| 6 | 0.53 |
| 7 | 0.44 |

As seen from the lateral aberration diagrams, in each zoom lens system, satisfactory symmetry is obtained in the lateral aberration at the axial image point. Further, when the lateral aberration at the +75% image point and the lateral aberration at the −75% image point are compared with each other in a basic state, all have a small degree of curvature and almost the same inclination in the aberration curve. Thus, decentering coma aberration and decentering astigmatism are small. This indicates that satisfactory imaging performance is obtained even in an image blur compensation state. Further, when the image blur compensation angle of a zoom lens system is the same, the amount of parallel translation required for image blur compensation decreases with decreasing focal length of the entire zoom lens system. Thus, at arbitrary zoom positions, satisfactory image blur compensation can be performed without degrading the imaging characteristics.

Numerical Example 1

The zoom lens system of Numerical Example 1 corresponds to Embodiment 1 shown in FIG. 1. The data of the zoom lens system according to Numerical Example 1 is shown in the following tables.

TABLE 2

(surface data)

| Surface number | r | d | nd | vd |
|---|---|---|---|---|
| Object surface | ∞ | Variable | | |
| 1 | 79.88860 | 1.20000 | 1.84666 | 23.8 |
| 2 | 55.84100 | 4.38040 | 1.49700 | 81.6 |
| 3 | −538.09420 | 0.20000 | | |
| 4 | 40.97500 | 4.17440 | 1.48749 | 70.4 |
| 5 | 171.38530 | Variable | | |
| 6 | 149.25700 | 0.80000 | 1.83400 | 37.3 |
| 7 | 19.24660 | 4.98360 | | |
| 8 | 31.30520 | 2.43820 | 1.84666 | 23.8 |
| 9 | 795.70900 | Variable | | |
| 10 | −46.11980 | 0.79940 | 1.77250 | 49.6 |
| 11 | 37.65760 | 0.68440 | | |
| 12 | 22.26400 | 1.39710 | 1.92286 | 20.9 |
| 13 | 26.59940 | 8.97180 | | |
| 14 (Aperture) | ∞ | Variable | | |
| 15 | −85.03340 | 1.80330 | 1.49700 | 81.6 |
| 16 | −35.73500 | 0.10050 | | |
| 17 | 165.76270 | 2.00390 | 1.49700 | 81.6 |
| 18 | −69.04310 | 0.20000 | | |
| 19 | 54.65300 | 0.80000 | 1.92286 | 20.9 |
| 20 | 37.32040 | 2.79140 | 1.49700 | 81.6 |
| 21 | −93.02670 | 0.20000 | | |
| 22 | 33.57310 | 3.54500 | 1.49700 | 81.6 |
| 23 | −37.21710 | 0.80220 | 1.88300 | 40.8 |
| 24 | −94.83610 | Variable | | |
| 25 | 3674.43700 | 0.70110 | 1.77250 | 49.6 |
| 26 | 23.16340 | Variable | | |
| 27 | 54.32140 | 2.27740 | 1.75520 | 27.5 |
| 28 | −46.59960 | 0.10000 | | |
| 29 | 153.18810 | 0.80000 | 1.83481 | 42.7 |
| 30 | 25.42440 | Variable | | |
| 31 | ∞ | 4.20000 | 1.51680 | 64.2 |
| 32 | ∞ | BF | | |
| Image surface | ∞ | | | |

TABLE 3-1

(various data)
Zooming ratio 4.24425

| | Wide | Middle | Telephoto |
|---|---|---|---|
| Focal length | 41.2718 | 89.3913 | 193.4154 |
| F number | 3.59391 | 4.65880 | 6.26304 |
| View angle | 15.0327 | 6.8445 | 3.1916 |
| Image height | 11.0300 | 11.0300 | 11.0300 |
| Overall length of lens system | 116.3210 | 129.8654 | 154.5799 |
| BF | 0.99156 | 1.01132 | 0.99975 |
| d0 | ∞ | ∞ | ∞ |
| d5 | 1.6530 | 22.7100 | 32.4306 |
| d9 | 8.5027 | 3.4756 | 5.9904 |
| d14 | 16.9073 | 8.9078 | 1.1313 |
| d24 | 15.3069 | 10.4853 | 1.0412 |
| d26 | 2.7426 | 3.3486 | 12.6422 |
| d30 | 19.8628 | 29.5727 | 49.9904 |

TABLE 3-2

(various data)

| | Wide | Middle | Telephoto |
|---|---|---|---|
| Focal length | 40.8785 | 86.3288 | 175.1678 |
| F number | 3.59488 | 4.66053 | 6.38448 |
| View angle | 15.0591 | 6.8432 | 3.1309 |
| Image height | 11.0300 | 11.0300 | 11.0300 |

TABLE 3-2-continued (various data)

| | Wide | Middle | Telephoto |
|---|---|---|---|
| Overall length of lens system | 116.3339 | 129.8760 | 154.4691 |
| BF | 1.01382 | 1.02127 | 0.89152 |
| d0 | 3883.6791 | 3870.1455 | 3845.4204 |
| d5 | 1.6530 | 22.7100 | 32.4306 |
| d9 | 8.5027 | 3.4756 | 5.9904 |
| d14 | 16.9073 | 8.9078 | 1.1313 |
| d24 | 15.4706 | 11.0079 | 2.1911 |
| d26 | 2.5696 | 2.8266 | 11.4897 |
| d30 | 19.8628 | 29.5727 | 49.9904 |

Numerical Example 2

Figure 5:
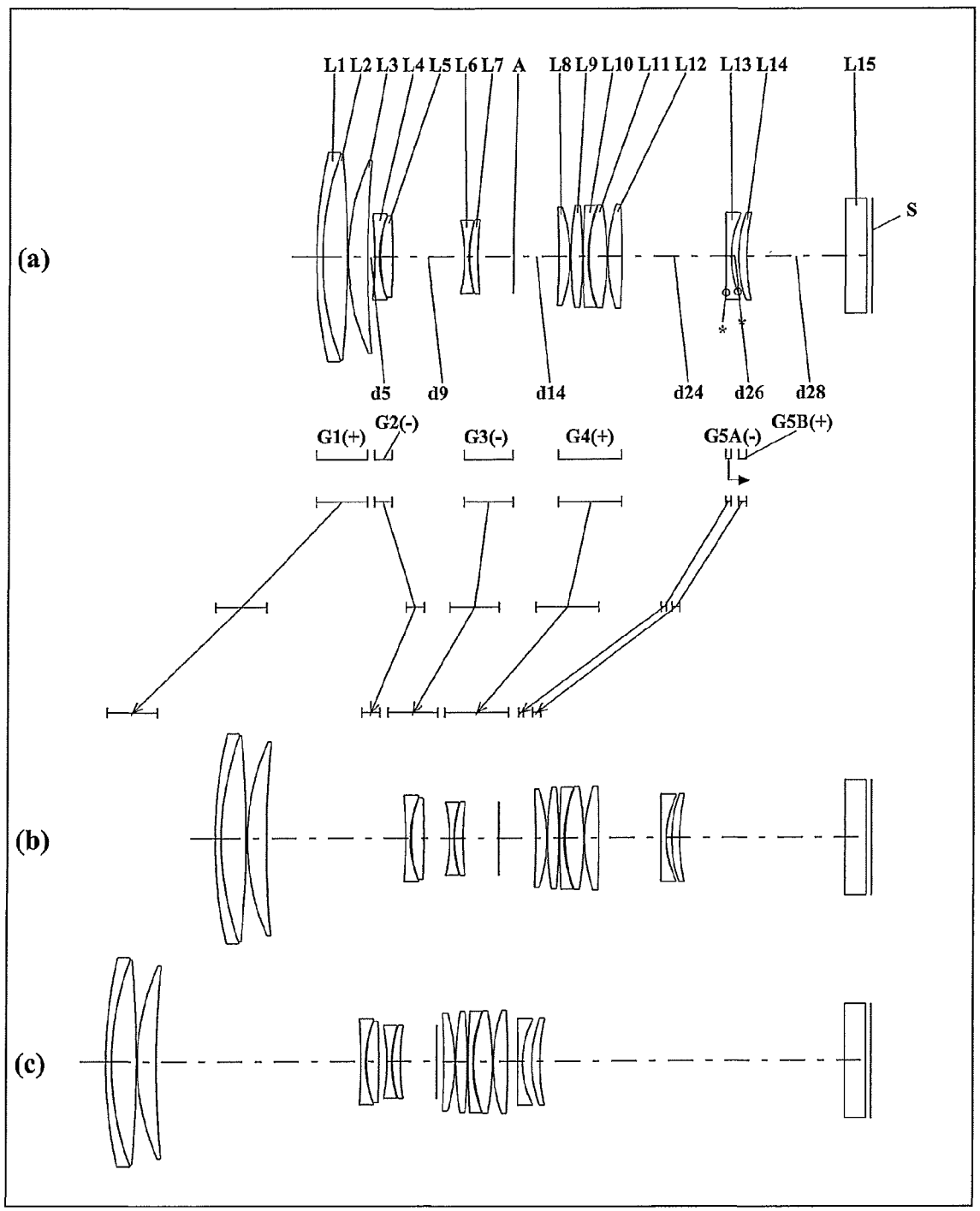
FIG. 5 is a lens arrangement diagram showing an infinity in-focus condition of a zoom lens system according to Embodiment 2 (Example 2)
Figure 6:
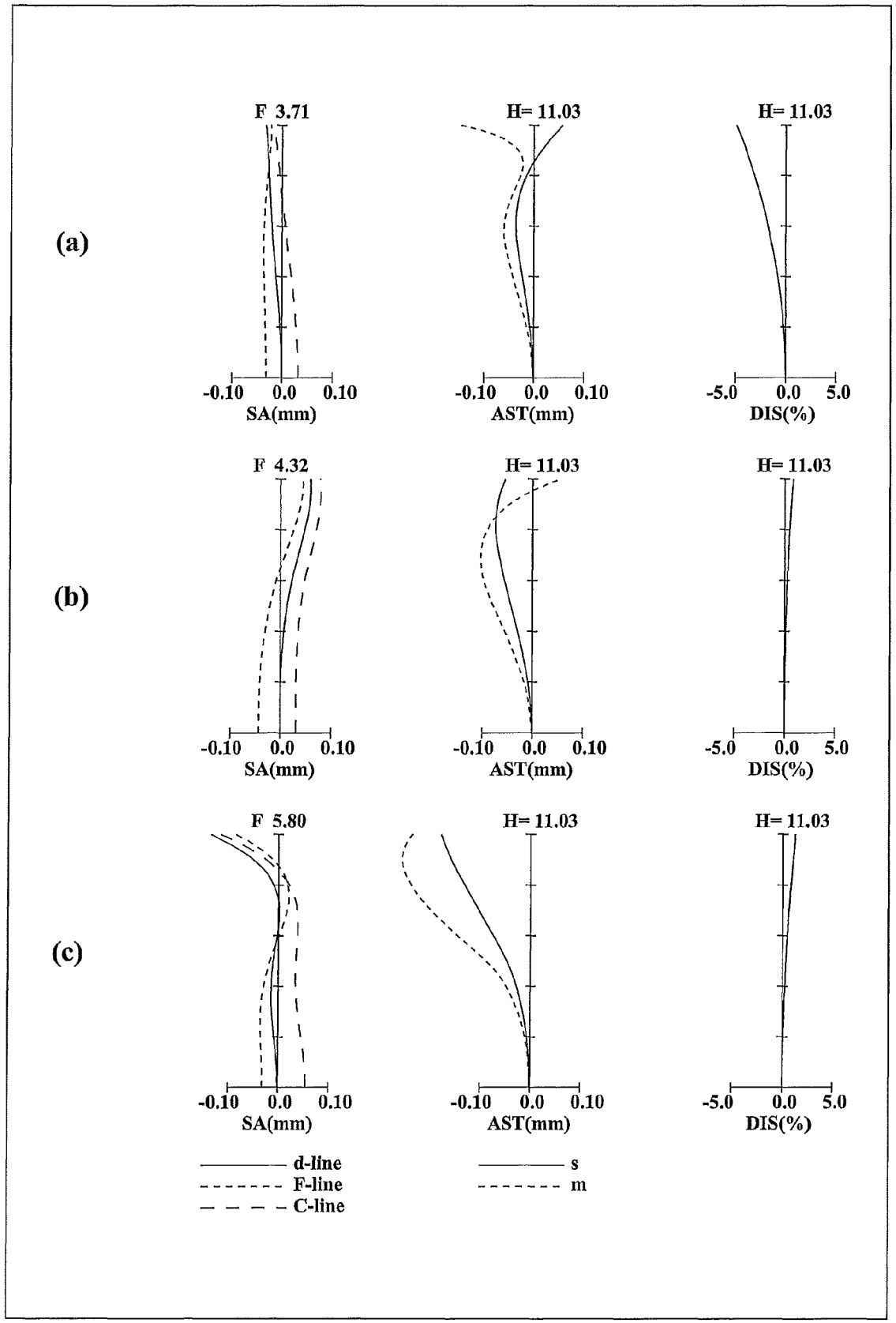
FIG. 6 is a longitudinal aberration diagram showing an infinity in-focus condition of a zoom lens system according to Example 2.
Figure 7:
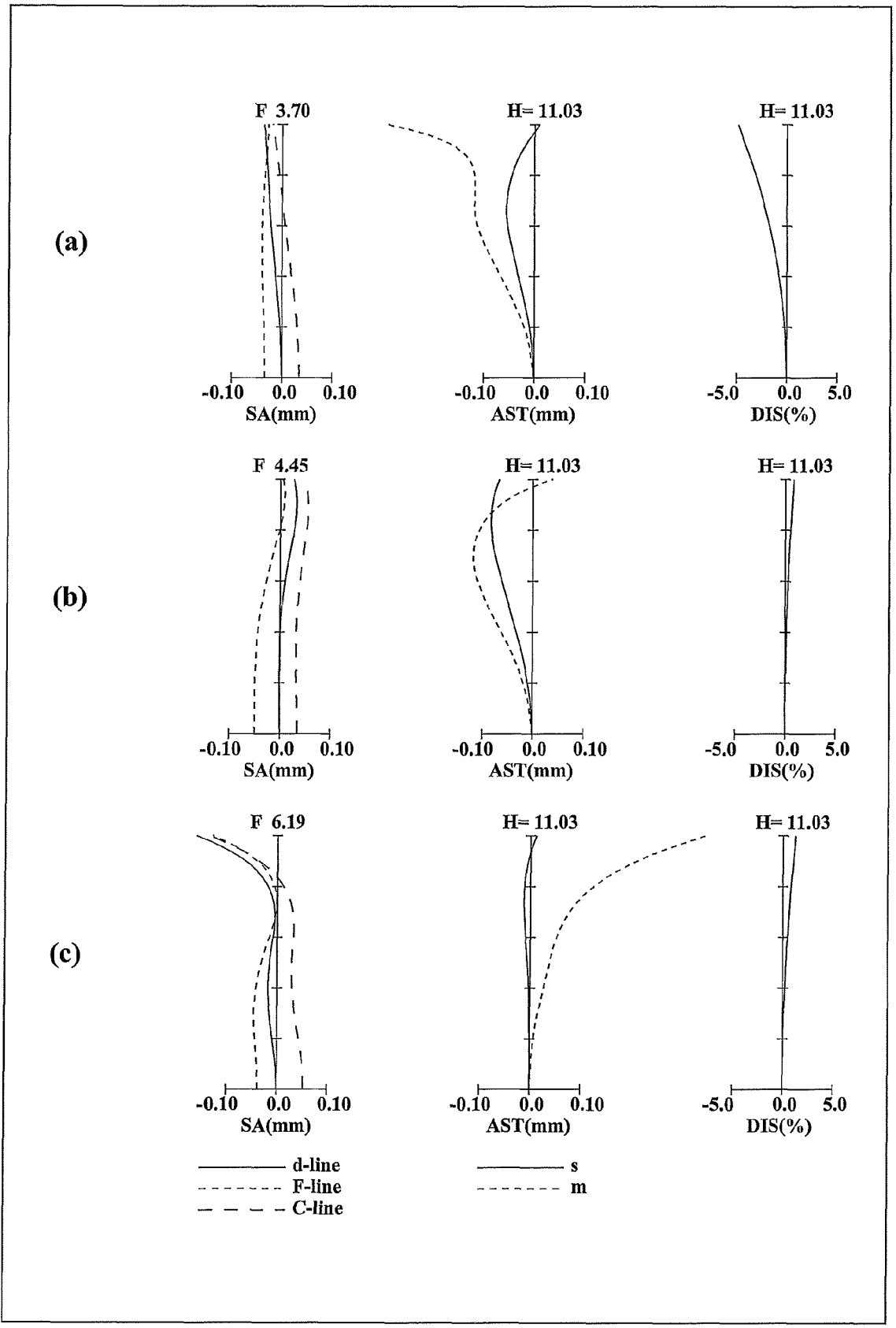
FIG. 7 is a longitudinal aberration diagram showing a close-point in-focus condition of a zoom lens system according to Example 2.
Figure 8:
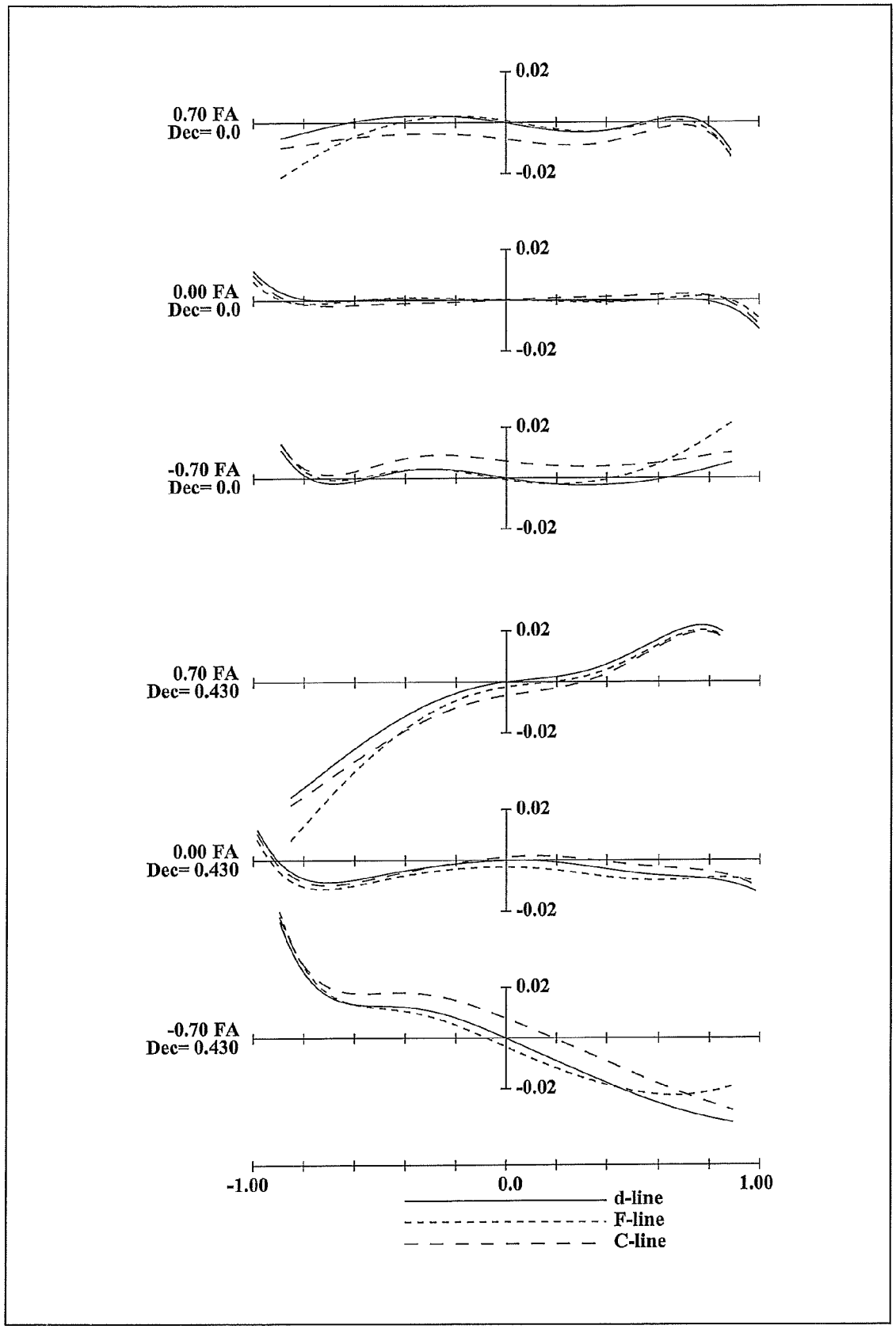
FIG. 8 is a lateral aberration diagram in a basic state where image blur compensation is not performed and in an image blur compensation state at a telephoto limit of a zoom lens system according to Example 2.

The zoom lens system of Numerical Example 2 corresponds to Embodiment 2 shown in FIG. 5. The data of the zoom lens system according to Numerical Example 2 is shown in the following tables.

TABLE 4

(surface data)

| Surface number | r | d | nd | vd |
|---|---|---|---|---|
| Object surface | ∞ | Variable | | |
| 1 | 96.08820 | 1.20030 | 1.84666 | 23.8 |
| 2 | 61.13150 | 4.96580 | 1.49700 | 81.6 |
| 3 | −233.55870 | 0.20000 | | |
| 4 | 47.75020 | 3.83530 | 1.48749 | 70.4 |
| 5 | 206.95980 | Variable | | |
| 6 | −107.60720 | 0.89610 | 1.88300 | 40.8 |
| 7 | 21.03400 | 0.25840 | | |
| 8 | 24.92220 | 2.49620 | 1.78470 | 26.1 |
| 9 | −228.53650 | Variable | | |
| 10 | −37.42360 | 0.90270 | 1.83481 | 42.7 |
| 11 | 27.11510 | 0.10000 | | |
| 12 | 24.16450 | 1.63050 | 1.92286 | 20.9 |
| 13 | 55.10970 | 7.17610 | | |
| 14 (Aperture) | ∞ | Variable | | |
| 15 | −198.76890 | 2.19660 | 1.49700 | 81.6 |
| 16 | −33.20810 | 0.18370 | | |
| 17 | 60.33330 | 2.29510 | 1.49700 | 81.6 |
| 18 | −114.41090 | 0.15780 | | |
| 19 | 170.03360 | 0.89890 | 1.84666 | 23.8 |
| 20 | 28.36260 | 0.20320 | | |
| 21 | 29.80500 | 3.66370 | 1.49700 | 81.6 |
| 22 | −61.71440 | 0.19890 | | |
| 23 | 32.38510 | 2.88520 | 1.58921 | 41.0 |
| 24 | −215.78670 | Variable | | |
| 25* | −696.90530 | 0.95800 | 1.69100 | 54.7 |
| 26* | 18.48420 | Variable | | |
| 27 | 25.42090 | 1.63640 | 1.84666 | 23.8 |
| 28 | 41.70670 | Variable | | |
| 29 | ∞ | 4.20000 | 1.51680 | 64.2 |
| 30 | ∞ | BF | | |
| Image surface | ∞ | | | |

TABLE 5

(aspherical data)

| Surface No. | Parameters |
|---|---|
| 25 | K = 0.00000E+00, A4 = −1.34852E−05, A6 = 4.68839E−07, A8 = −4.71690E−09, A10 = 1.38874E−11 |
| 26 | K = 0.00000E+00, A4 = −2.58833E−05, A6 = 5.06789E−07, A8 = −4.85574E−09, A10 = 7.62677E−12 |

TABLE 6-1

(various data)
Zooming ratio 4.19912

| | Wide | Middle | Telephoto |
|---|---|---|---|
| Focal length | 41.5596 | 88.1623 | 182.1306 |
| F number | 3.70547 | 4.32493 | 5.80463 |
| View angle | 15.5868 | 7.0732 | 3.4237 |
| Image height | 11.0300 | 11.0300 | 11.0300 |
| Overall length of lens system | 111.2799 | 131.2672 | 153.1675 |
| BF | 1.02055 | 1.02107 | 1.02173 |
| d0 | ∞ | ∞ | ∞ |
| d5 | 1.4200 | 27.8703 | 40.9047 |
| d9 | 14.2808 | 5.0996 | 1.7207 |
| d14 | 9.1160 | 7.3403 | 1.4733 |
| d24 | 20.8421 | 12.4878 | 1.9989 |
| d26 | 1.5346 | 1.0433 | 1.8495 |
| d28 | 19.9269 | 33.2659 | 61.0598 |

TABLE 6-2

(various data)

| | Wide | Middle | Telephoto |
|---|---|---|---|
| Focal length | 41.1818 | 87.7556 | 174.5136 |
| F number | 3.70197 | 4.45073 | 6.19004 |
| View angle | 15.5982 | 6.8813 | 3.2215 |
| Image height | 11.0300 | 11.0300 | 11.0300 |
| Overall length of lens system | 111.2848 | 132.6071 | 156.5461 |
| BF | 1.02549 | 3.87898 | 5.91833 |
| d0 | 4000.0000 | 4000.0000 | 4000.0000 |
| d5 | 1.4200 | 27.8703 | 40.9047 |
| d9 | 14.2808 | 4.8789 | 1.5000 |
| d14 | 9.1160 | 7.3403 | 1.4733 |
| d24 | 21.0270 | 12.4890 | 2.6288 |
| d26 | 1.3497 | 0.5243 | 0.7018 |
| d28 | 19.9269 | 32.4864 | 60.2803 |

Numerical Example 3

Figure 9:
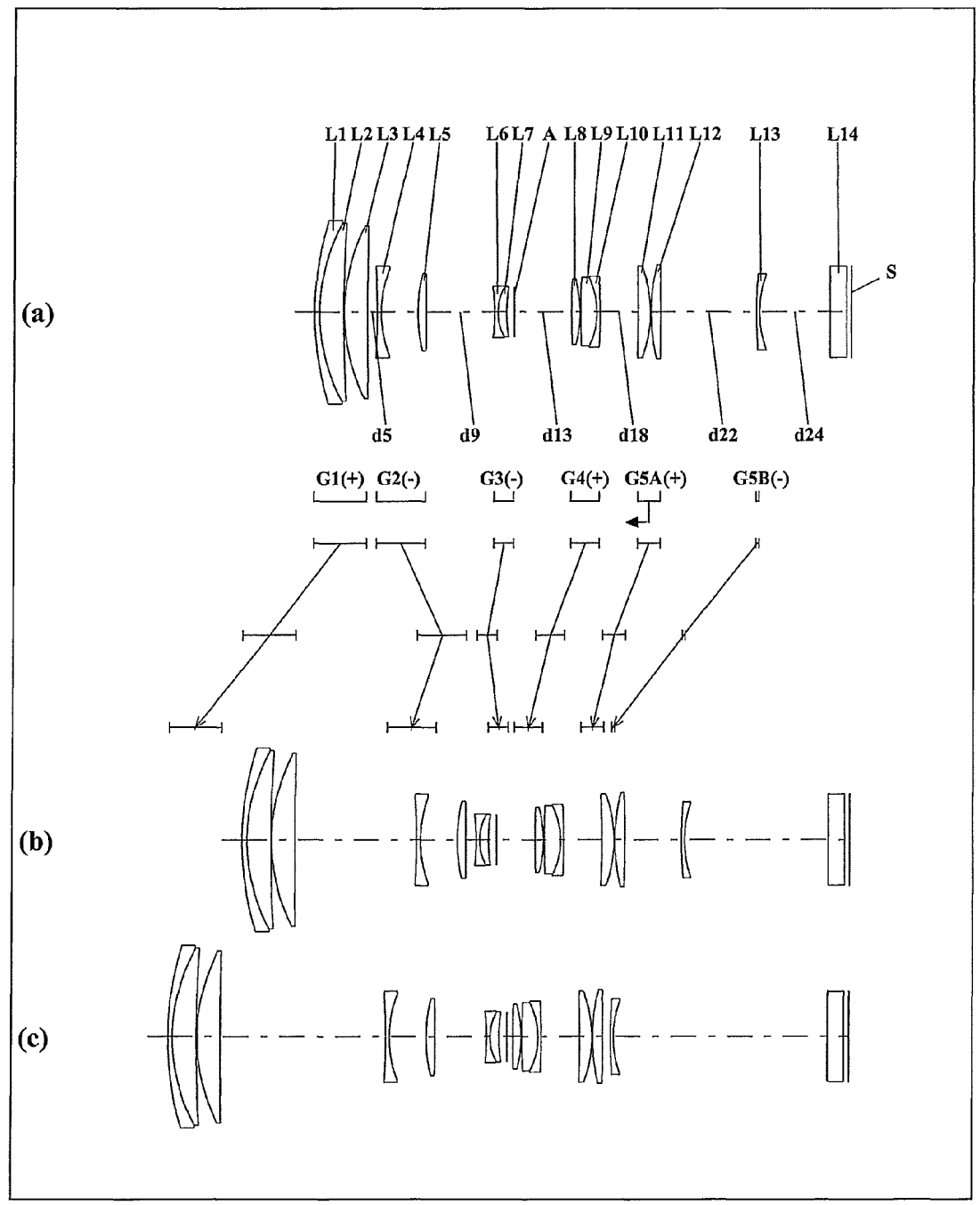
FIG. 9 is a lens arrangement diagram showing an infinity in-focus condition of a zoom lens system according to Embodiment 3 (Example 3)
Figure 10:
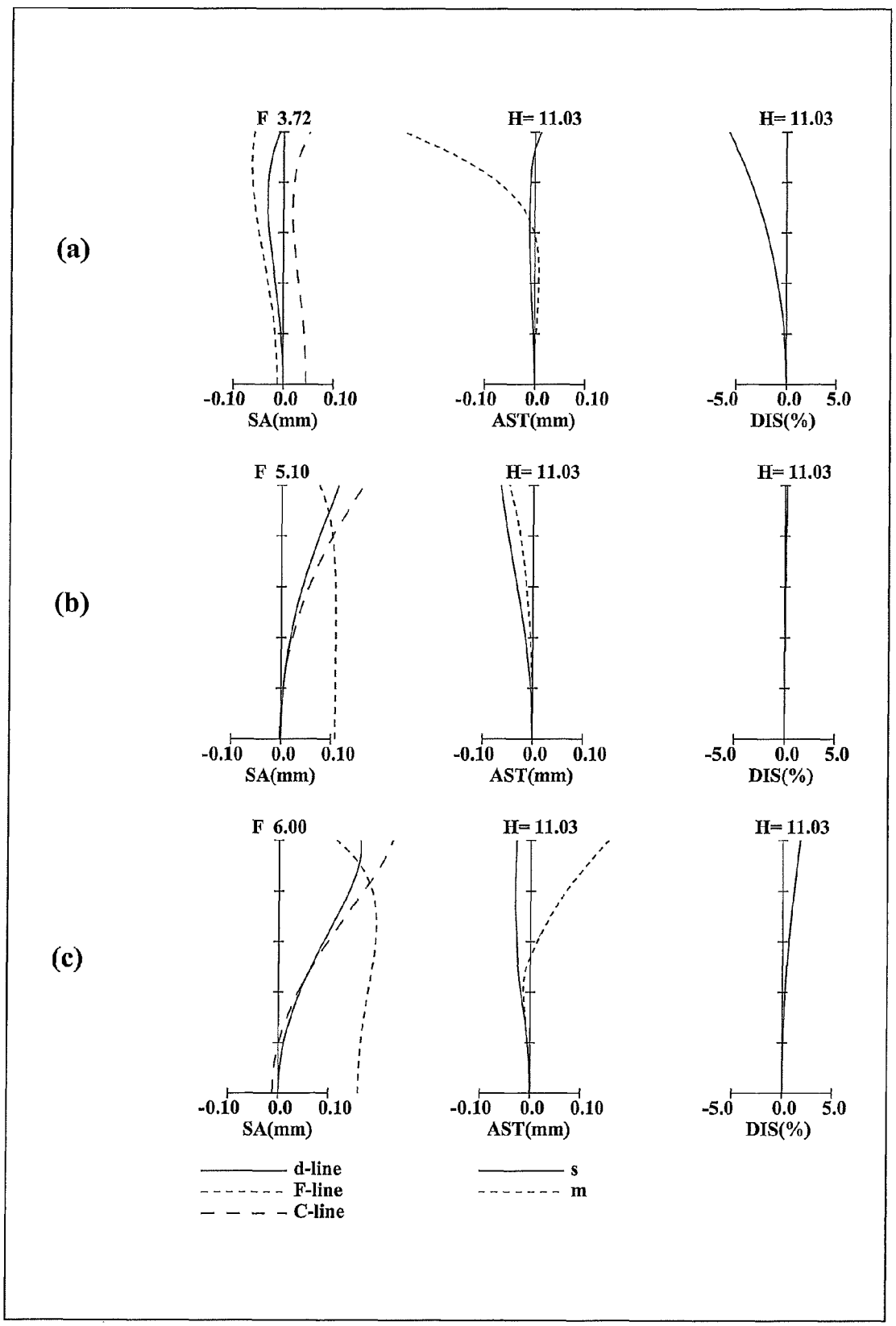
FIG. 10 is a longitudinal aberration diagram showing an infinity in-focus condition of a zoom lens system according to Example 3.
Figure 11:
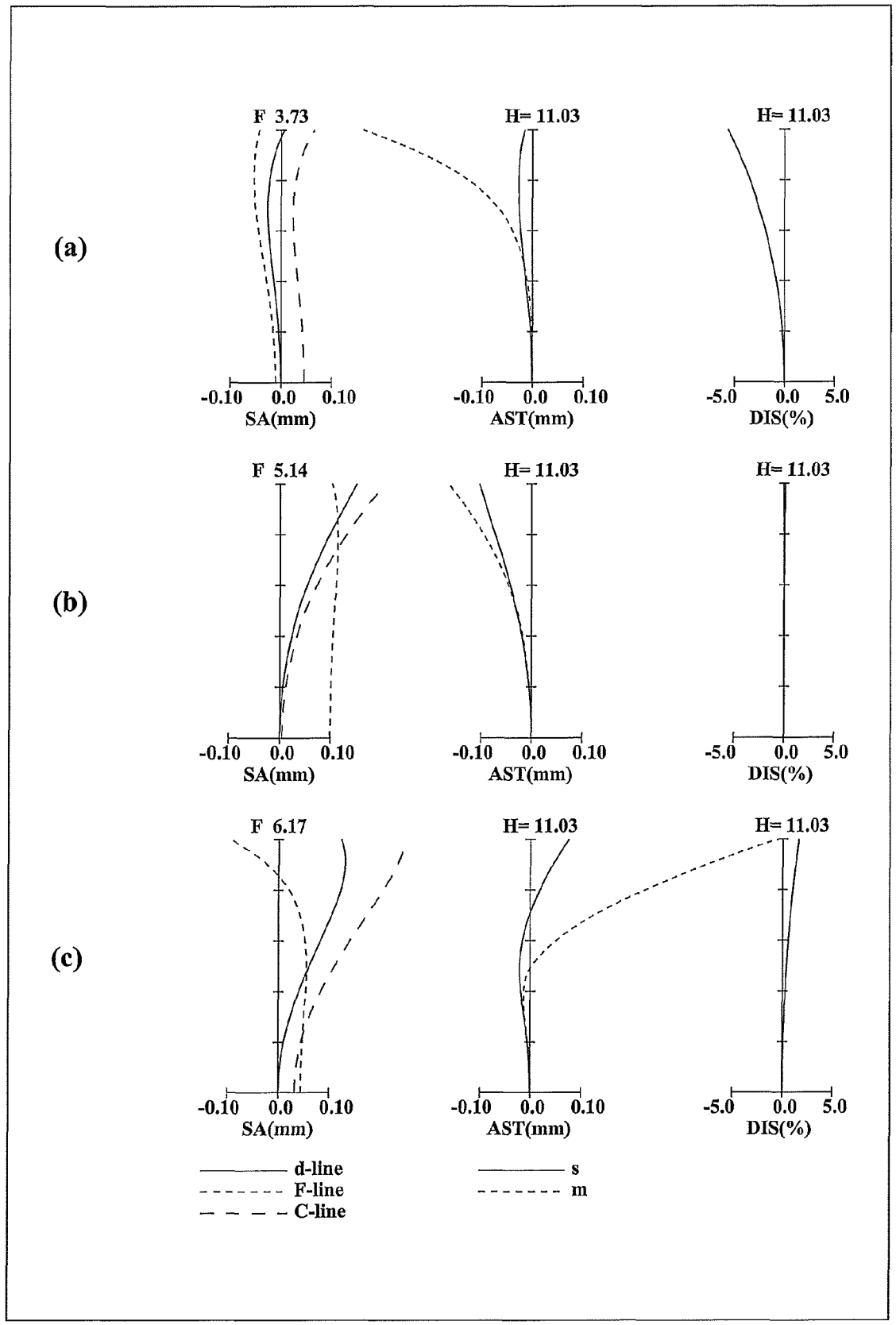
FIG. 11 is a longitudinal aberration diagram showing a close-point in-focus condition of a zoom lens system according to Example 3.
Figure 12:
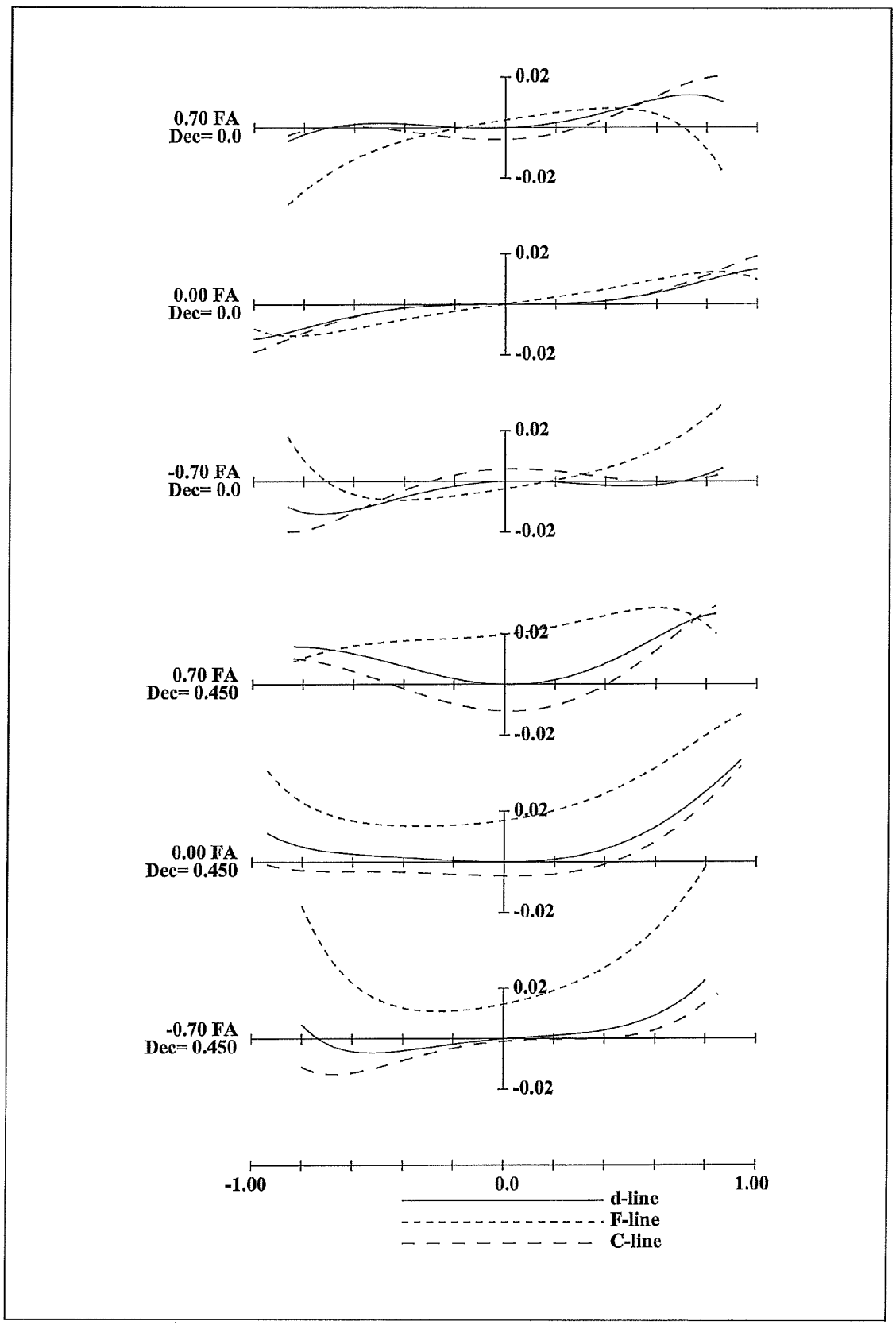
FIG. 12 is a lateral aberration diagram in a basic state where image blur compensation is not performed and in an image blur compensation state at a telephoto limit of a zoom lens system according to Example 3.

The zoom lens system of Numerical Example 3 corresponds to Embodiment 3 shown in FIG. 9. The data of the zoom lens system according to Numerical Example 3 is shown in the following tables.

TABLE 7

(surface data)

| Surface number | r | d | nd | vd |
|---|---|---|---|---|
| Object surface | ∞ | Variable | | |
| 1 | 78.42590 | 1.19980 | 1.87800 | 38.2 |
| 2 | 46.72820 | 6.00690 | 1.49700 | 81.6 |
| 3 | 350.38430 | 0.19360 | | |
| 4 | 48.17050 | 5.84260 | 1.49700 | 81.4 |
| 5 | 1457.09620 | Variable | | |
| 6 | −201.19250 | 1.00000 | 1.75670 | 36.3 |
| 7 | 30.51420 | 9.30230 | | |
| 8 | 42.78680 | 2.10060 | 1.82027 | 29.7 |
| 9 | −1708.73110 | Variable | | |
| 10 | −45.94270 | 0.79990 | 1.75500 | 52.3 |
| 11 | 13.13030 | 2.22310 | 1.84666 | 23.9 |
| 12 | 37.49120 | 2.00070 | | |
| 13 (Aperture) | ∞ | Variable | | |
| 14 | 258.91190 | 2.09420 | 1.59380 | 61.4 |
| 15 | −31.30260 | 0.19920 | | |
| 16 | 269.94740 | 4.08650 | 1.52540 | 70.5 |
| 17 | −18.77030 | 0.79960 | 1.83918 | 23.9 |
| 18 | −167.79930 | Variable | | |
| 19 | −366.58870 | 3.09910 | 1.49700 | 81.6 |

TABLE 7-continued (surface data)

| Surface number | r | d | nd | vd |
|---|---|---|---|---|
| 20 | −32.55030 | 0.20020 | | |
| 21 | 48.78510 | 2.47730 | 1.71852 | 33.5 |
| 22 | −551.02540 | Variable | | |
| 23 | 123.85260 | 0.77430 | 1.71371 | 54.5 |
| 24 | 27.80440 | Variable | | |
| 25 | ∞ | 4.19990 | 1.51680 | 64.2 |
| 26 | ∞ | 1.20462 | | |
| Image surface | ∞ | 0.00000 | | |

TABLE 8-1

(various data)
Zooming ratio 4.700

| | Wide | Middle | Telephoto |
|---|---|---|---|
| Focal length | 41.3304 | 89.7286 | 194.5268 |
| F number | 3.71919 | 5.10373 | 5.99992 |
| View angle | 15.7997 | 6.9927 | 3.1902 |
| Image height | 11.0300 | 11.0300 | 11.0300 |
| Overall length of lens system | 135.1359 | 152.7756 | 171.2381 |
| BF | 1.20462 | 1.24030 | 1.30620 |
| d0 | ∞ | ∞ | ∞ |
| d5 | 2.4969 | 30.6249 | 41.5125 |
| d9 | 17.1808 | 2.6465 | 13.0905 |
| d13 | 14.3097 | 9.7475 | 1.4834 |
| d18 | 9.5266 | 9.5266 | 9.5266 |
| d22 | 24.0081 | 14.2184 | 2.0000 |
| d24 | 17.8096 | 36.1716 | 53.7187 |

TABLE 8-2

(various data)

| | Wide | Middle | Telephoto |
|---|---|---|---|
| Focal length | 41.1585 | 88.0536 | 178.8076 |
| F number | 3.72518 | 5.13555 | 6.16865 |
| View angle | 15.7691 | 6.9514 | 3.1059 |
| Image height | 11.0300 | 11.0300 | 11.0300 |
| Overall length of lens system | 135.1538 | 152.7643 | 171.3291 |
| BF | 1.22216 | 1.22902 | 1.39756 |
| d0 | 4000.0000 | 4000.0000 | 4000.0000 |
| d5 | 2.4969 | 30.6249 | 41.5125 |
| d9 | 17.1808 | 2.6465 | 13.0905 |
| d13 | 14.3097 | 9.7475 | 1.4834 |
| d18 | 9.3169 | 8.8948 | 7.5627 |
| d22 | 24.2179 | 14.8502 | 3.9640 |
| d24 | 17.8096 | 36.1716 | 53.7186 |

Numerical Example 4

Figure 13:
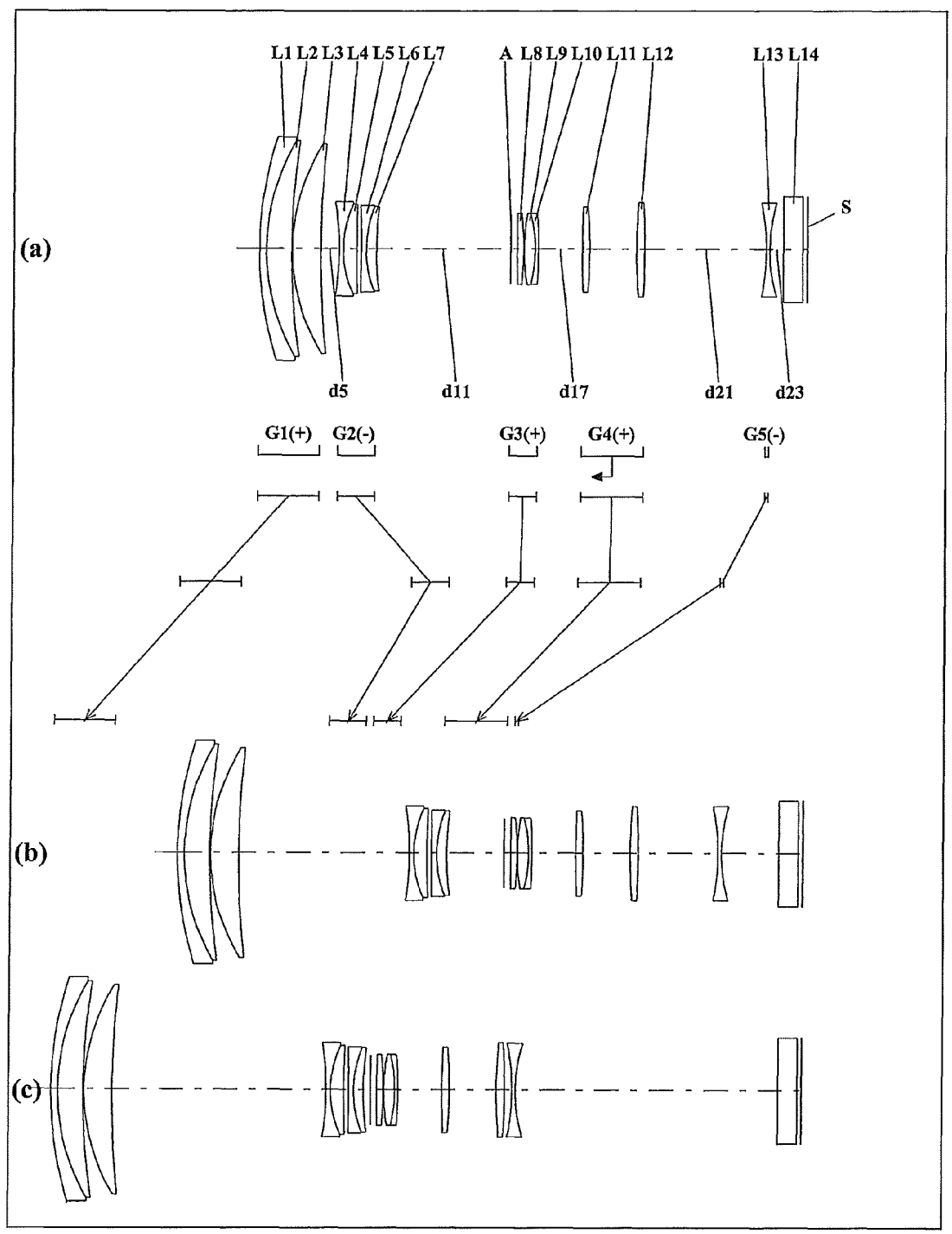
FIG. 13 is a lens arrangement diagram showing an infinity in-focus condition of a zoom lens system according to Embodiment 4 (Example 4)
Figure 14:
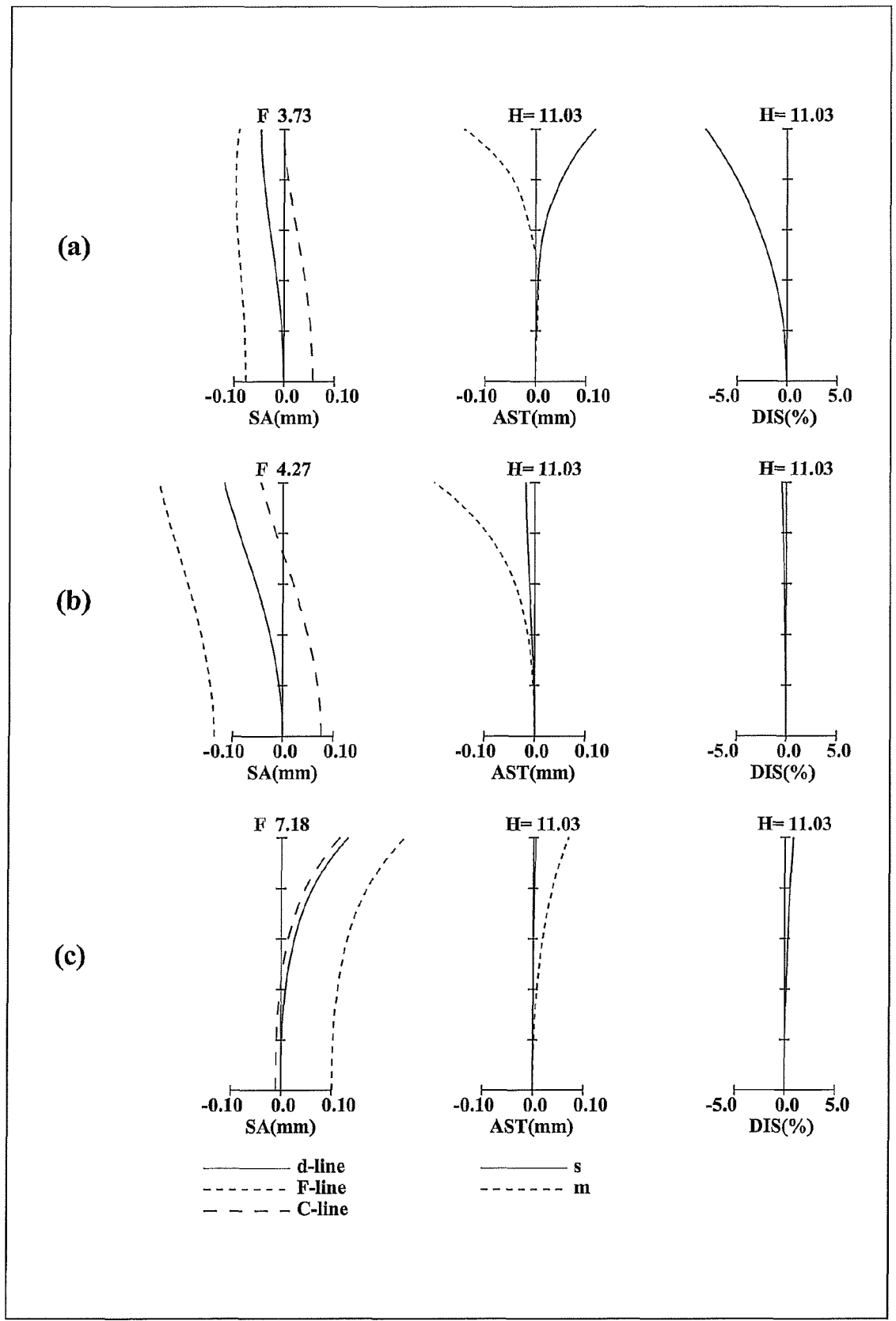
FIG. 14 is a longitudinal aberration diagram showing an infinity in-focus condition of a zoom lens system according to Example 4.
Figure 15:
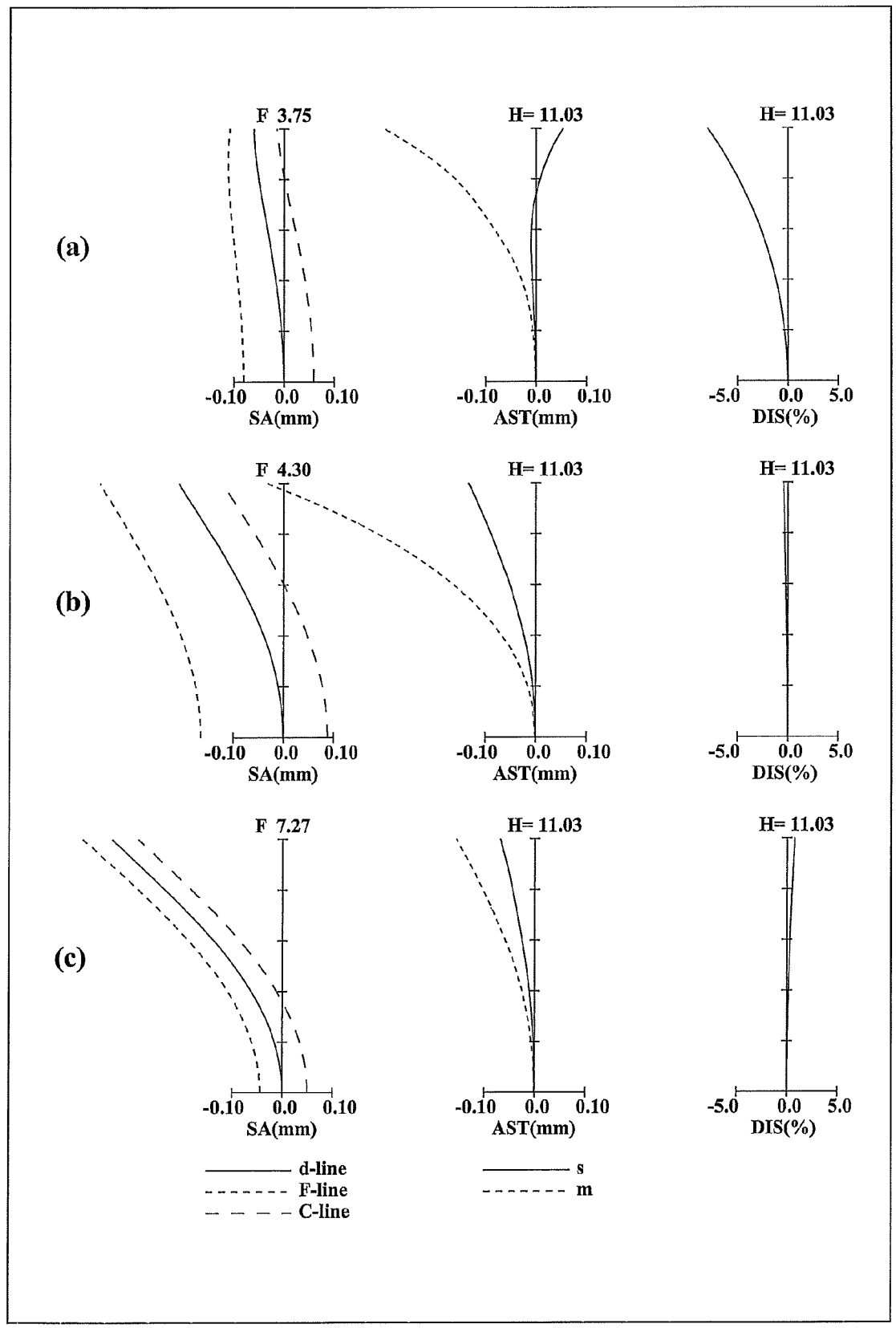
FIG. 15 is a longitudinal aberration diagram showing a close-point in-focus condition of a zoom lens system according to Example 4.
Figure 16:
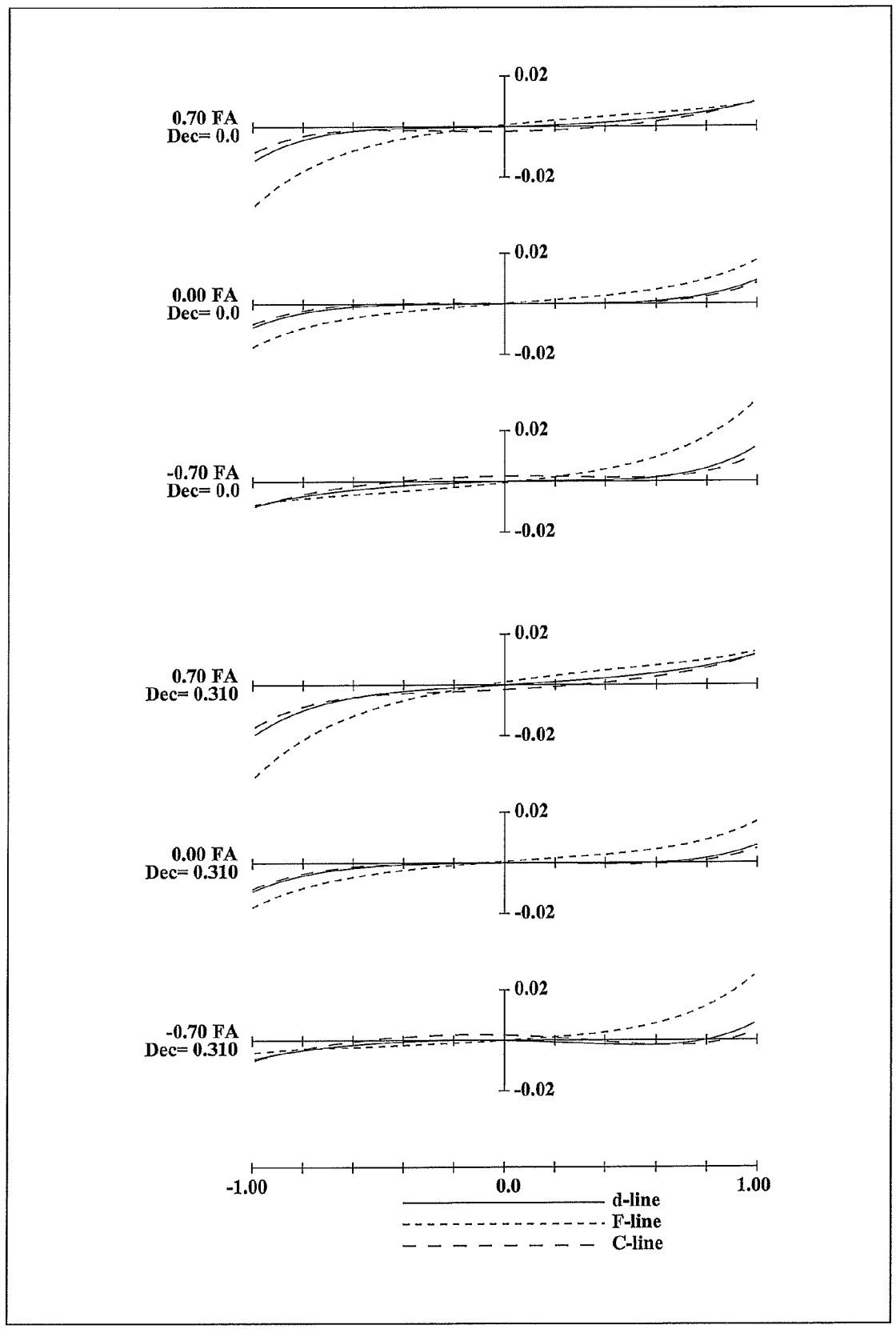
FIG. 16 is a lateral aberration diagram in a basic state where image blur compensation is not performed and in an image blur compensation state at a telephoto limit of a zoom lens system according to Example 4.

The zoom lens system of Numerical Example 4 corresponds to Embodiment 4 shown in FIG. 13. The data of the zoom lens system according to Numerical Example 4 is shown in the following tables.

TABLE 9

(surface data)

| Surface number | r | d | nd | vd |
|---|---|---|---|---|
| Object surface | ∞ | ∞ | | |
| 1 | 79.59080 | 1.50000 | 1.87800 | 38.2 |
| 2 | 46.59430 | 5.45970 | 1.49700 | 81.6 |
| 3 | 155.01950 | 0.19360 | | |
| 4 | 43.44630 | 6.11360 | 1.49700 | 81.6 |
| 5 | 211.45010 | Variable | | |
| 6 | −64.05960 | 0.90000 | 1.75670 | 36.3 |
| 7 | 22.89500 | 2.89770 | 1.82114 | 24.1 |
| 8 | 249.92920 | 1.00000 | | |
| 9 | −340.83290 | 1.13370 | 1.75670 | 36.3 |
| 10 | 25.32540 | 2.10770 | 1.84666 | 23.8 |
| 11 | 68.82910 | Variable | | |
| 12 (Aperture) | ∞ | 1.40000 | | |
| 13 | 2150.07340 | 1.44350 | 1.59380 | 61.4 |
| 14 | −69.29450 | 0.10100 | | |
| 15 | 48.20190 | 2.29980 | 1.52540 | 70.5 |
| 16 | −30.63980 | 0.75000 | 1.83918 | 23.9 |
| 17 | −94.66950 | Variable | | |
| 18 | 234.43110 | 1.57580 | 1.49700 | 81.6 |
| 19 | −113.37950 | 10.20840 | | |
| 20 | 117.93500 | 1.74200 | 1.71852 | 33.5 |
| 21 | −186.97620 | Variable | | |
| 22 | −49.72050 | 0.77430 | 1.49700 | 81.4 |
| 23 | 35.46500 | Variable | | |
| 24 | ∞ | 4.19990 | 1.51680 | 64.2 |
| 25 | ∞ | 0.96800 | | |
| 26 | ∞ | 0.00000 | | |
| 27 | ∞ | 0.05779 | | |
| Image surface | ∞ | 0.00000 | | |

TABLE 10-1

(various data)
Zooming ratio 4.70100

| | Wide | Middle | Telephoto |
|---|---|---|---|
| Focal length | 41.2110 | 89.3336 | 193.7326 |
| F number | 3.73123 | 4.26565 | 7.17771 |
| View angle | 16.2431 | 7.0701 | 3.2335 |
| Image height | 11.0300 | 11.0300 | 11.0300 |
| Overall length of lens system | 118.8851 | 135.5682 | 162.6738 |
| BF | 0.05779 | 0.15305 | −0.10748 |
| d0 | ∞ | ∞ | ∞ |
| d5 | 4.0000 | 37.0408 | 46.5472 |
| d11 | 29.1704 | 12.4000 | 1.4999 |
| d17 | 9.5265 | 9.5266 | 9.5269 |
| d21 | 26.3617 | 17.1321 | 1.6000 |
| d23 | 3.0000 | 12.5469 | 56.8386 |

TABLE 10-2

(various data)

| | Wide | Middle | Telephoto |
|---|---|---|---|
| Focal length | 40.9238 | 85.8540 | 175.9349 |
| F number | 3.75311 | 4.29688 | 7.26520 |
| View angle | 16.1200 | 7.0087 | 3.1923 |
| Image height | 11.0300 | 11.0300 | 11.0300 |
| Overall length of lens system | 118.9674 | 135.6579 | 163.0442 |
| BF | 0.24003 | 0.24277 | 0.26307 |
| d0 | 4000.0000 | 4000.0000 | 4000.0000 |
| d5 | 4.0000 | 37.0408 | 46.5472 |
| d11 | 29.1704 | 12.4000 | 1.4999 |
| d17 | 9.1980 | 8.3391 | 7.6216 |
| d21 | 26.5903 | 18.3196 | 3.5051 |
| d23 | 3.0000 | 12.5469 | 56.8386 |

Numerical Example 5

Figure 17:
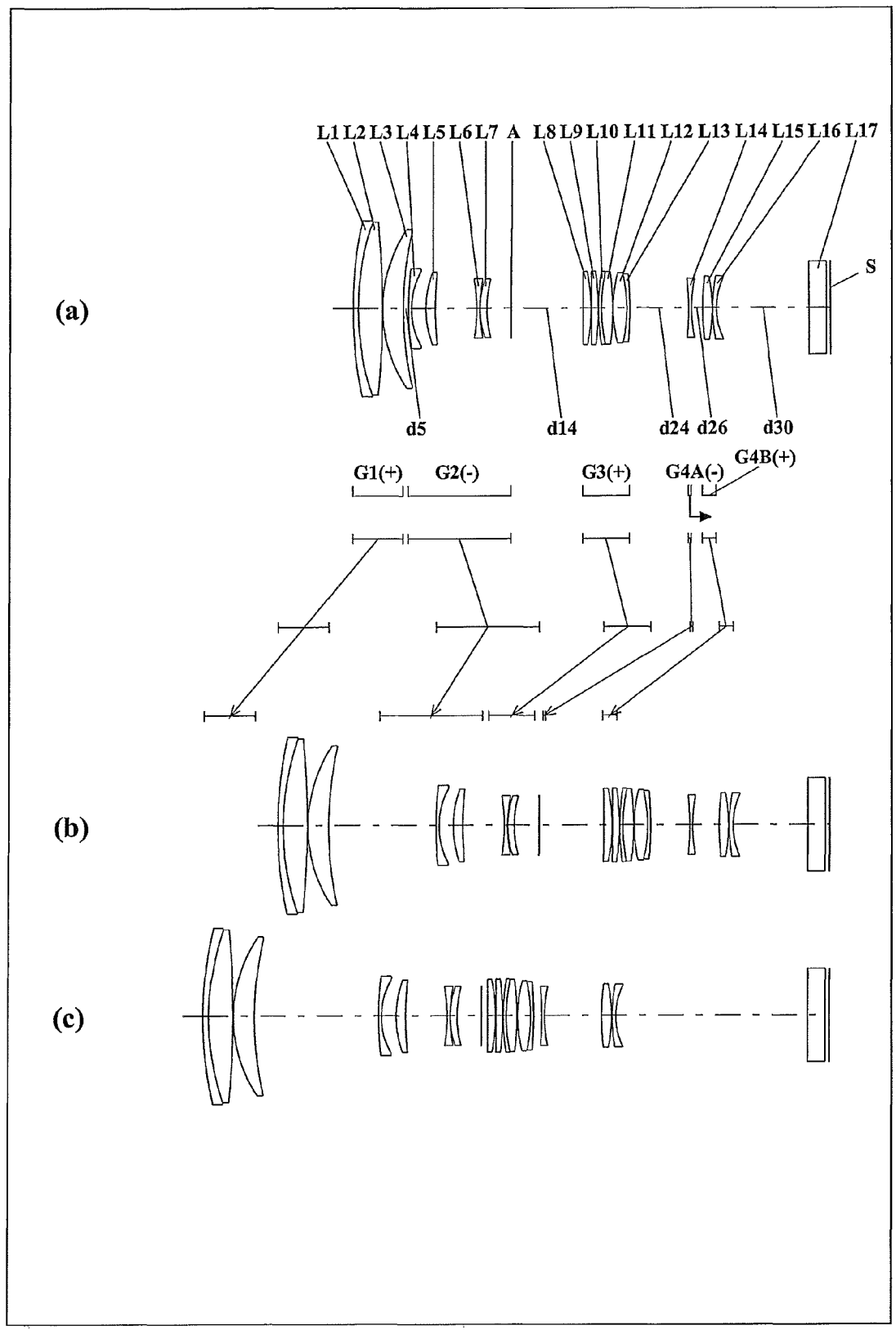
FIG. 17 is a lens arrangement diagram showing an infinity in-focus condition of a zoom lens system according to Embodiment 5 (Example 5)
Figure 18:
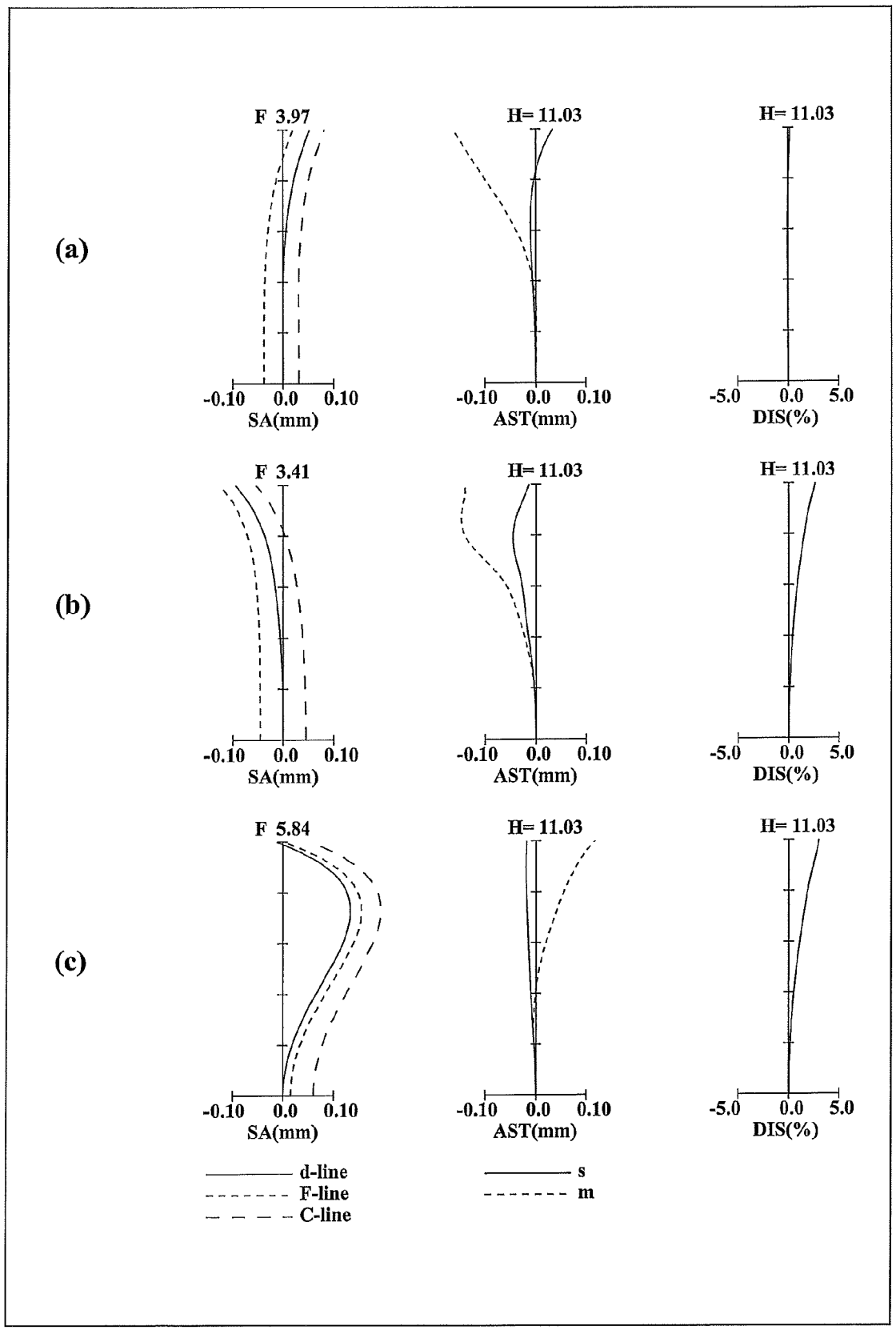
FIG. 18 is a longitudinal aberration diagram showing an infinity in-focus condition of a zoom lens system according to Example 5.
Figure 19:
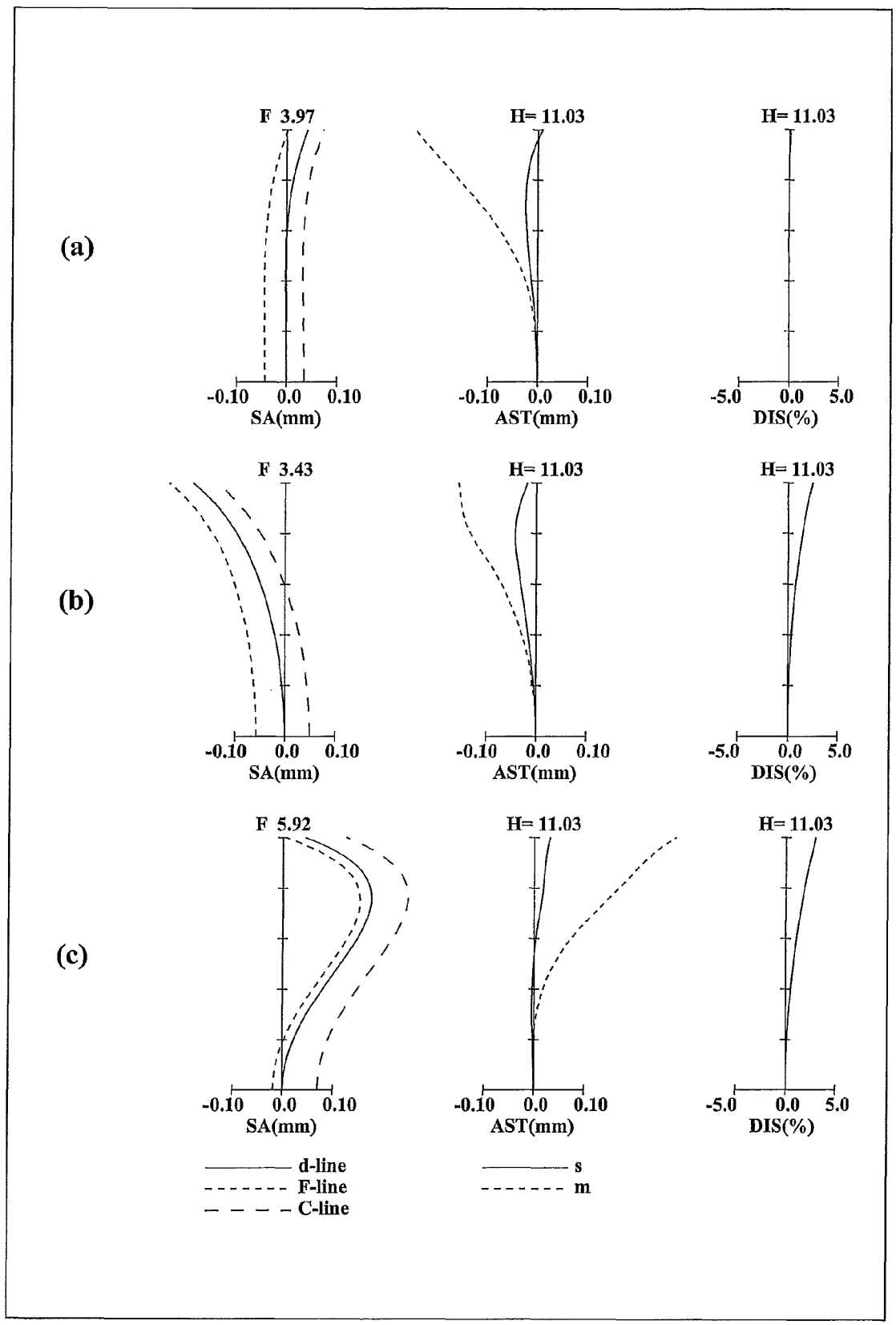
FIG. 19 is a longitudinal aberration diagram showing a close-point in-focus condition of a zoom lens system according to Example 5.
Figure 20:
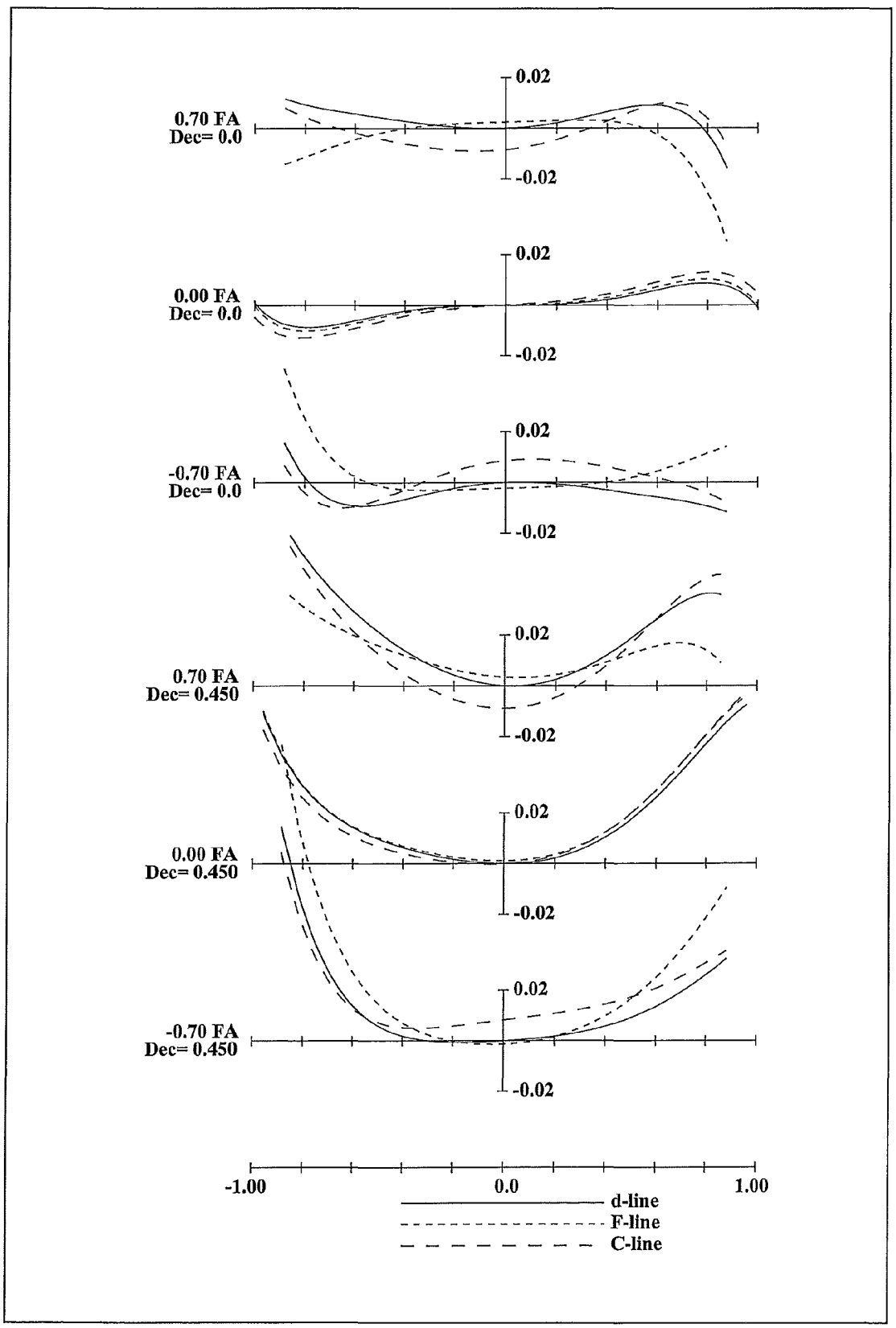
FIG. 20 is a lateral aberration diagram in a basic state where image blur compensation is not performed and in an image blur compensation state at a telephoto limit of a zoom lens system according to Example 5.

The zoom lens system of Numerical Example 5 corresponds to Embodiment 5 shown in FIG. 17. The data of the zoom lens system according to Numerical Example 5 is shown in the following tables.

TABLE 11

(surface data)

| Surface number | r | d | nd | vd |
|---|---|---|---|---|
| Object surface | ∞ | Variable | | |
| 1 | 101.86910 | 1.29990 | 1.84666 | 23.8 |
| 2 | 66.30390 | 5.97060 | 1.49700 | 81.6 |
| 3 | −228.10900 | 0.10000 | | |
| 4 | 35.31660 | 5.13250 | 1.48749 | 70.4 |
| 5 | 86.31380 | Variable | | |
| 6 | 87.50050 | 0.72560 | 1.83400 | 37.3 |
| 7 | 18.84310 | 3.61870 | | |
| 8 | 25.42790 | 2.31830 | 1.84666 | 23.8 |
| 9 | 79.88120 | 10.33950 | | |
| 10 | −43.20810 | 0.70000 | 1.68966 | 53.0 |
| 11 | 31.99480 | 0.10000 | | |
| 12 | 21.48710 | 1.67870 | 1.84666 | 23.8 |
| 13 | 26.79970 | 6.04420 | | |
| 14 (Aperture) | ∞ | Variable | | |
| 15 | −894.97490 | 1.95800 | 1.49700 | 81.6 |
| 16 | −46.15270 | 0.10000 | | |
| 17 | −1236.84750 | 1.71990 | 1.49700 | 81.6 |
| 18 | −64.62930 | 0.10000 | | |
| 19 | 57.92080 | 0.70000 | 1.92286 | 20.9 |
| 20 | 40.65290 | 2.72120 | 1.49700 | 81.6 |
| 21 | −69.36640 | 0.10000 | | |
| 22 | 32.56890 | 3.31170 | 1.49700 | 81.6 |
| 23 | −39.36570 | 0.70000 | 1.88300 | 40.8 |
| 24 | −108.41110 | Variable | | |
| 25 | −70.52180 | 0.70000 | 1.80420 | 46.5 |
| 26 | 35.99030 | Variable | | |
| 27 | 64.19020 | 2.38010 | 1.75520 | 27.5 |
| 28 | −42.09660 | 0.16700 | | |
| 29 | 42.28970 | 0.92740 | 1.83481 | 42.7 |
| 30 | 18.48540 | Variable | | |
| 31 | ∞ | 4.20000 | 1.51680 | 64.2 |
| 32 | ∞ | 1.01774 | | |
| Image surface | ∞ | 0.00000 | | |

TABLE 12-1

(various data)
Zooming ratio 4.174

| | Wide | Middle | Telephoto |
|---|---|---|---|
| Focal length | 46.2021 | 93.1218 | 192.8345 |
| F number | 3.96589 | 3.41298 | 5.83505 |
| View angle | 13.4051 | 6.5844 | 3.1782 |
| Image height | 11.0300 | 11.0300 | 11.0300 |
| Overall length of lens system | 118.3633 | 136.6181 | 154.8564 |
| BF | 1.01774 | 1.05534 | 0.98741 |
| d0 | ∞ | ∞ | ∞ |
| d5 | 1.2000 | 26.5739 | 30.8067 |
| d14 | 17.8126 | 16.0634 | 1.5284 |
| d24 | 14.6195 | 9.7262 | 2.0014 |
| d26 | 2.7154 | 6.5150 | 14.0847 |
| d30 | 23.1848 | 18.8710 | 47.6345 |

TABLE 12-2

(various data)

| | Wide | Middle | Telephoto |
|---|---|---|---|
| Focal length | 45.7045 | 89.2199 | 175.2455 |
| F number | 3.97342 | 3.42649 | 5.92175 |
| View angle | 13.4334 | 6.6355 | 3.1114 |
| Image height | 11.0300 | 11.0300 | 11.0300 |
| Overall length of lens system | 118.3706 | 136.6451 | 154.7802 |
| BF | 1.00732 | 1.08544 | 0.90846 |
| d0 | 3884.0557 | 3864.6948 | 3845.7762 |
| d5 | 1.2000 | 26.5739 | 30.8067 |
| d14 | 17.8126 | 16.0634 | 1.5284 |
| d24 | 14.8046 | 10.4834 | 3.2462 |
| d26 | 2.5480 | 5.7547 | 12.8426 |
| d30 | 23.1848 | 18.8710 | 47.6345 |

Numerical Example 6

Figure 21:
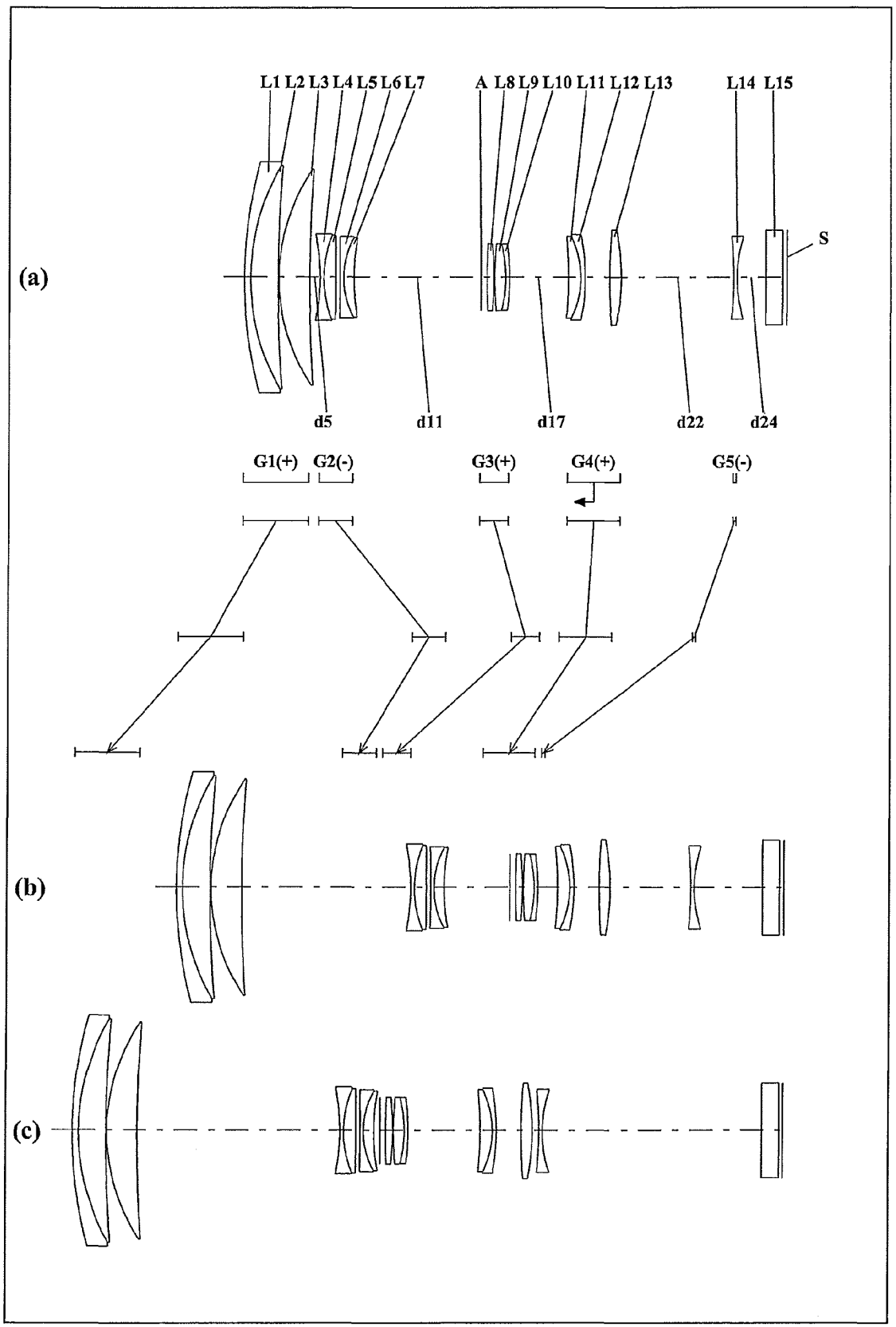
FIG. 21 is a lens arrangement diagram showing an infinity in-focus condition of a zoom lens system according to Embodiment 6 (Example 6)
Figure 22:
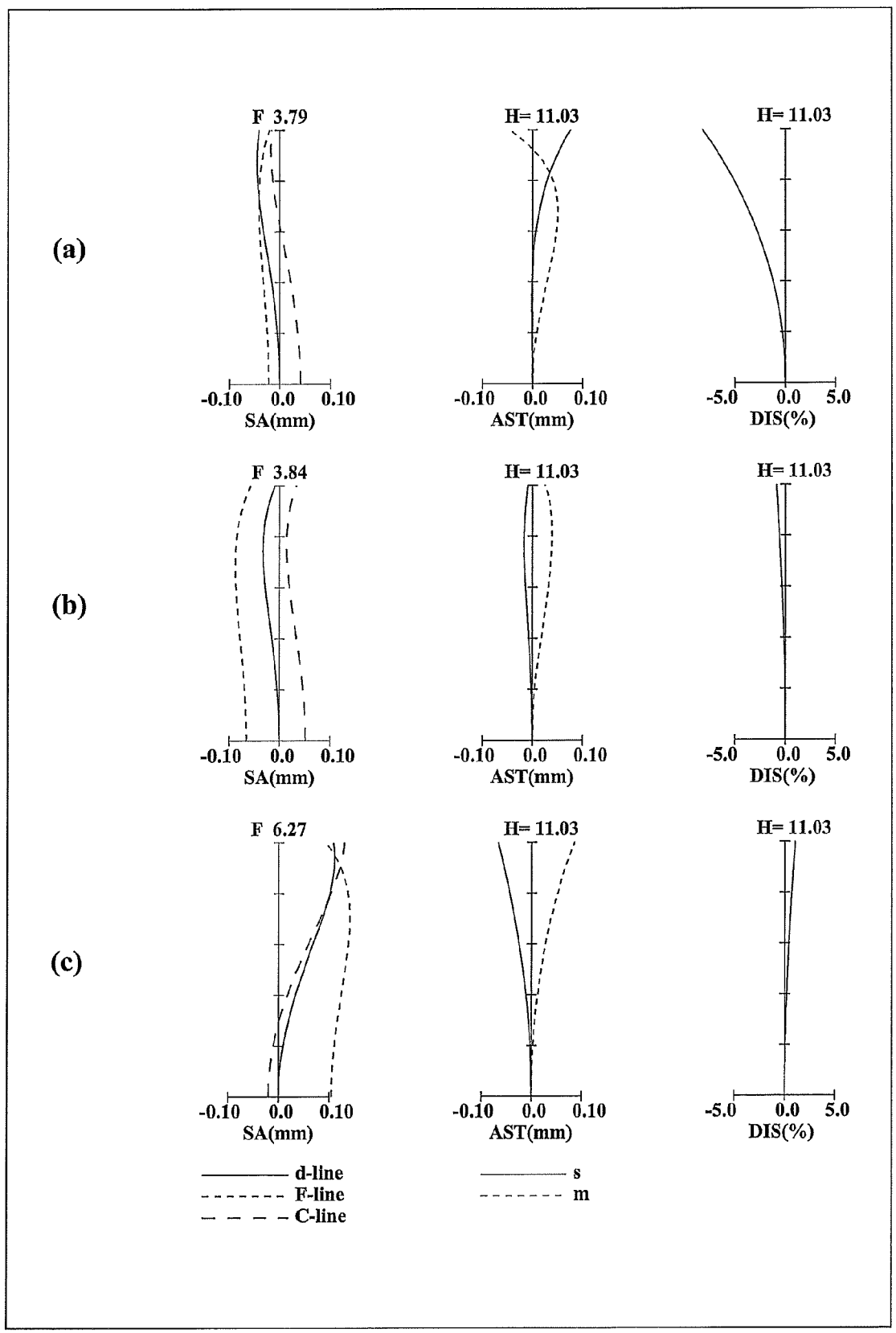
FIG. 22 is a longitudinal aberration diagram showing an infinity in-focus condition of a zoom lens system according to Example 6.
Figure 23:
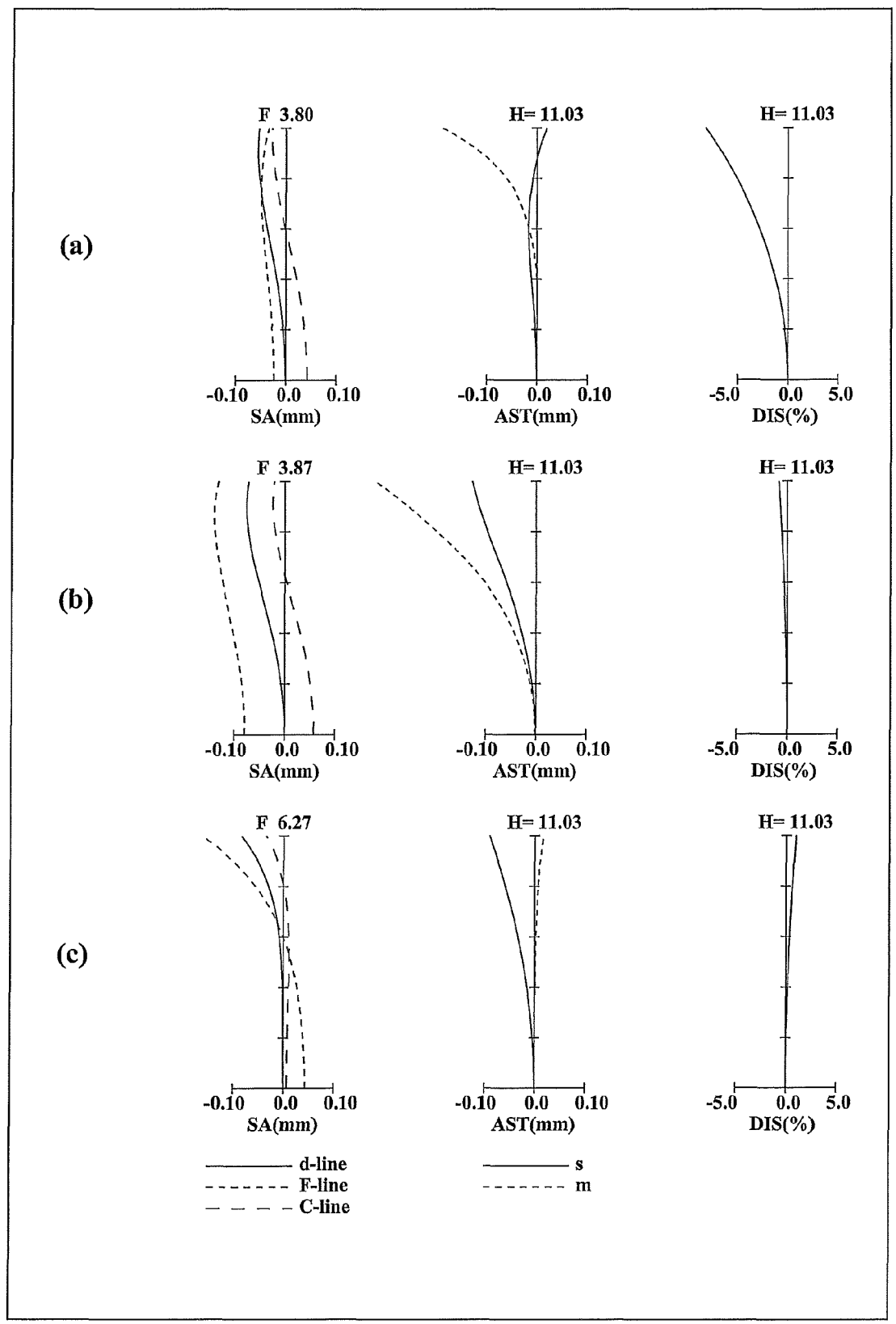
FIG. 23 is a longitudinal aberration diagram showing a close-point in-focus condition of a zoom lens system according to Example 6.
Figure 24:
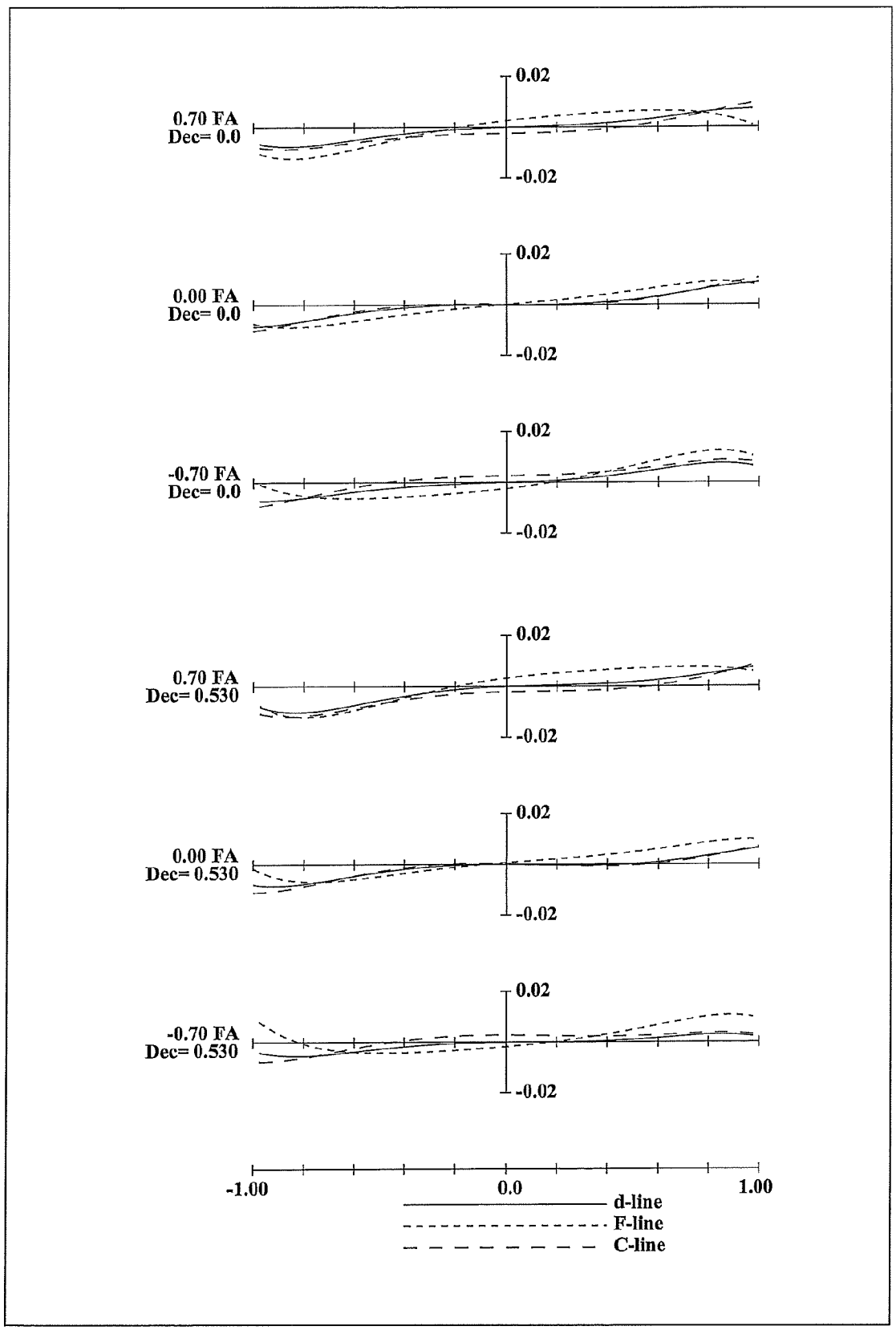
FIG. 24 is a lateral aberration diagram in a basic state where image blur compensation is not performed and in an image blur compensation state at a telephoto limit of a zoom lens system according to Example 6.

The zoom lens system of Numerical Example 6 corresponds to Embodiment 6 shown in FIG. 21. The data of the zoom lens system according to Numerical Example 6 is shown in the following tables.

TABLE 13

(surface data)

| Surface number | r | d | nd | vd |
|---|---|---|---|---|
| Object surface | ∞ | Variable | | |
| 1 | 105.76950 | 1.50000 | 1.87800 | 38.2 |
| 2 | 53.77680 | 6.66460 | 1.49700 | 81.6 |
| 3 | 340.13350 | 0.19360 | | |
| 4 | 46.97100 | 7.40980 | 1.49700 | 81.6 |
| 5 | 373.40520 | Variable | | |
| 6 | −52.72810 | 0.90000 | 1.75670 | 36.3 |
| 7 | 26.40860 | 2.97170 | 1.82114 | 24.1 |
| 8 | −861.19410 | 1.00000 | | |
| 9 | −421.29720 | 0.80000 | 1.75670 | 36.3 |
| 10 | 19.82580 | 2.47080 | 1.84666 | 23.8 |
| 11 | 50.87700 | Variable | | |
| 12 (Aperture) | ∞ | 1.50000 | | |
| 13 | 203.59460 | 1.63710 | 1.59380 | 61.4 |
| 14 | −85.30760 | 0.19920 | | |
| 15 | 91.20520 | 2.64410 | 1.52540 | 70.5 |
| 16 | −31.81360 | 0.90020 | 1.83918 | 23.9 |
| 17 | −60.29420 | Variable | | |
| 18 | −99.01460 | 2.94700 | 1.52540 | 70.5 |
| 19 | −22.70510 | 1.00040 | 1.84666 | 23.8 |
| 20 | −54.22510 | 6.00000 | | |
| 21 | 138.03640 | 2.71030 | 1.80518 | 25.5 |
| 22 | −60.84110 | Variable | | |
| 23 | −97.88170 | 0.77430 | 1.49700 | 81.6 |
| 24 | 31.95350 | Variable | | |
| 25 | ∞ | 4.20000 | 1.51680 | 64.2 |
| 26 | ∞ | BF | | |
| Image surface | ∞ | | | |

TABLE 14-1

(various data)
Zooming ratio 3.03537

| | Wide | Middle | Telephoto |
|---|---|---|---|
| Focal length | 41.2032 | 89.4043 | 194.0453 |
| F number | 3.78895 | 3.83625 | 6.26967 |
| View angle | 16.2596 | 7.0951 | 3.2212 |
| Image height | 11.0300 | 11.0300 | 11.0300 |
| Overall length of lens system | 131.4548 | 146.9379 | 171.9059 |

TABLE 14-1-continued (various data)
Zooming ratio 3.03537

|     | Wide    | Middle  | Telephoto |
|-----|---------|---------|-----------|
| BF  | 1.03034 | 1.02675 | 0.90588   |
| d0  | ∞       | ∞       | ∞         |
| d5  | 2.5000  | 40.8069 | 49.0288   |
| d11 | 30.8728 | 15.8915 | 1.4999    |
| d17 | 14.2711 | 4.6788  | 17.4979   |
| d22 | 27.3576 | 19.4750 | 1.6000    |
| d24 | 6.9999  | 16.6358 | 52.9503   |

TABLE 14-2

(various data)

|                         | Wide     | Middle   | Telephoto |
|-------------------------|----------|----------|-----------|
| Focal length            | 40.8452  | 86.3119  | 125.0668  |
| F number                | 3.79514  | 3.87060  | 4.85795   |
| View angle              | 16.2338  | 7.0456   | 4.6874    |
| Image height            | 11.0300  | 11.0300  | 11.0300   |
| Overall length of lens system | 131.4911 | 147.0370 | 160.4176 |
| BF                      | 1.06657  | 1.12591  | 1.08122   |
| d0                      | 4000.0000| 4000.0000| 4000.0000 |
| d5                      | 2.5000   | 40.8069  | 46.4214   |
| d11                     | 30.8728  | 15.8915  | 10.0988   |
| d17                     | 13.9532  | 3.5098   | 12.8857   |
| d22                     | 27.6755  | 20.6440  | 11.5067   |
| d24                     | 6.9999   | 16.6358  | 30.0007   |

Numerical Example 7

Figure 25:
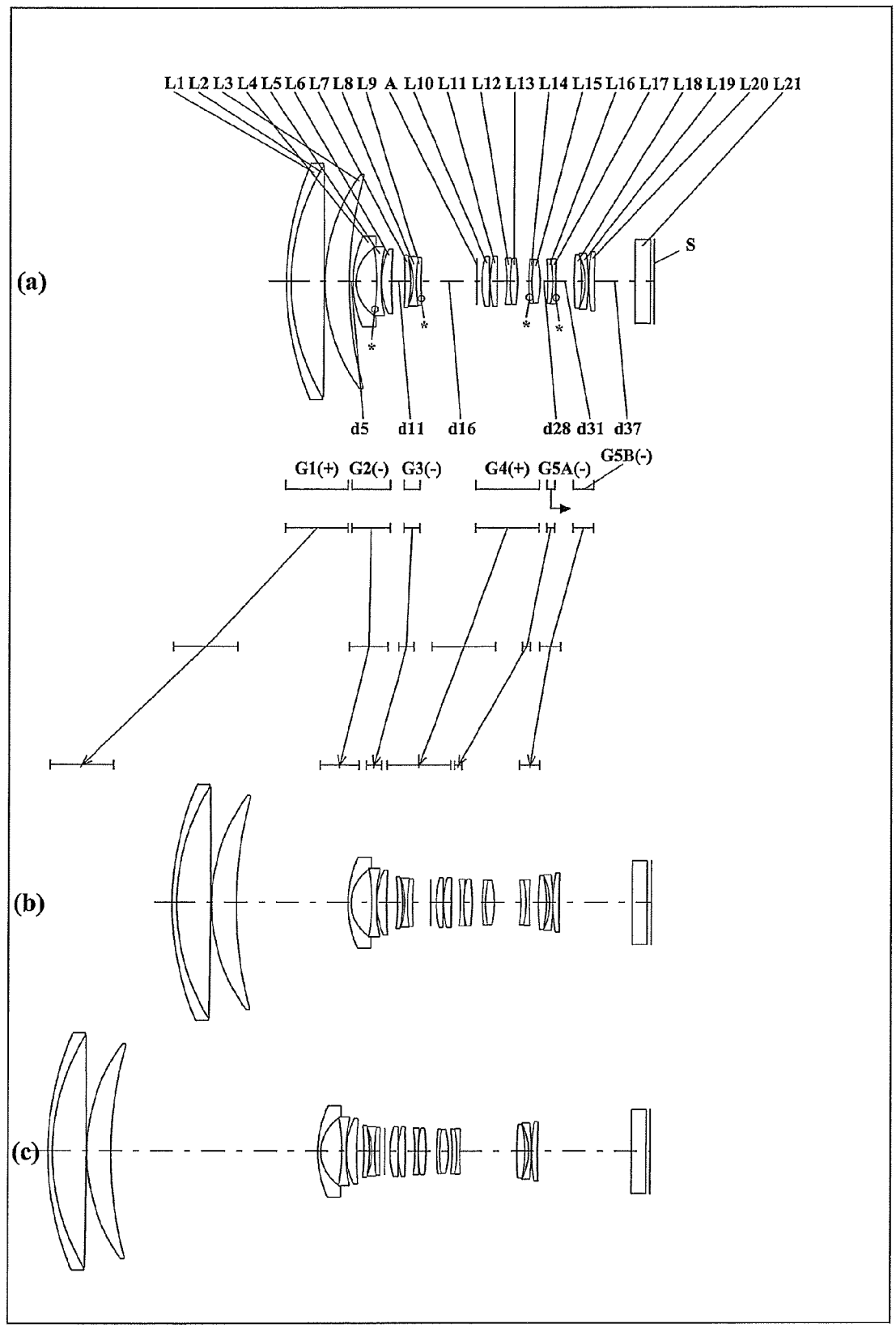
FIG. 25 is a lens arrangement diagram showing an infinity in-focus condition of a zoom lens system according to Embodiment 7 (Example 7)
Figure 26:
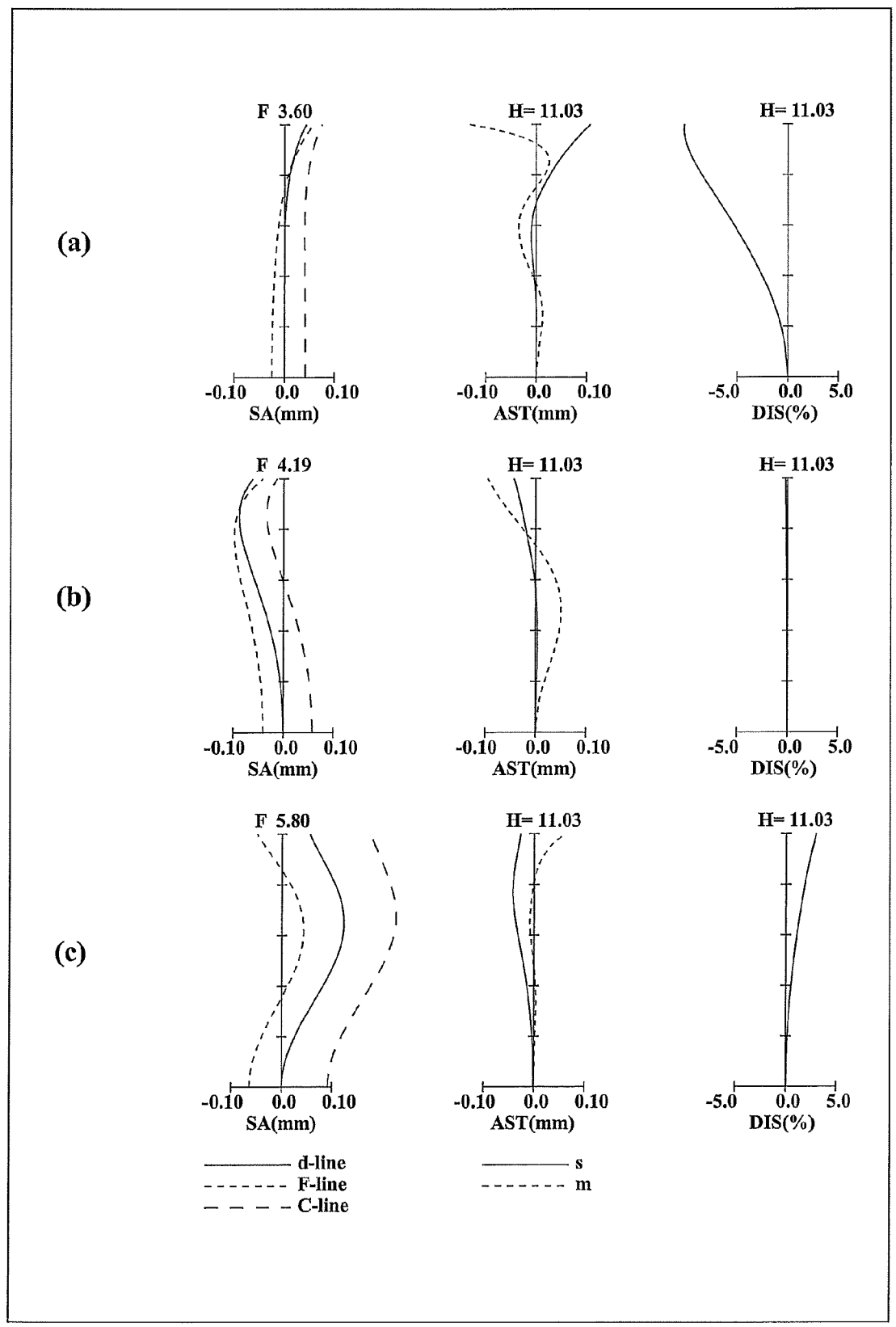
FIG. 26 is a longitudinal aberration diagram showing an infinity in-focus condition of a zoom lens system according to Example 7.
Figure 27:
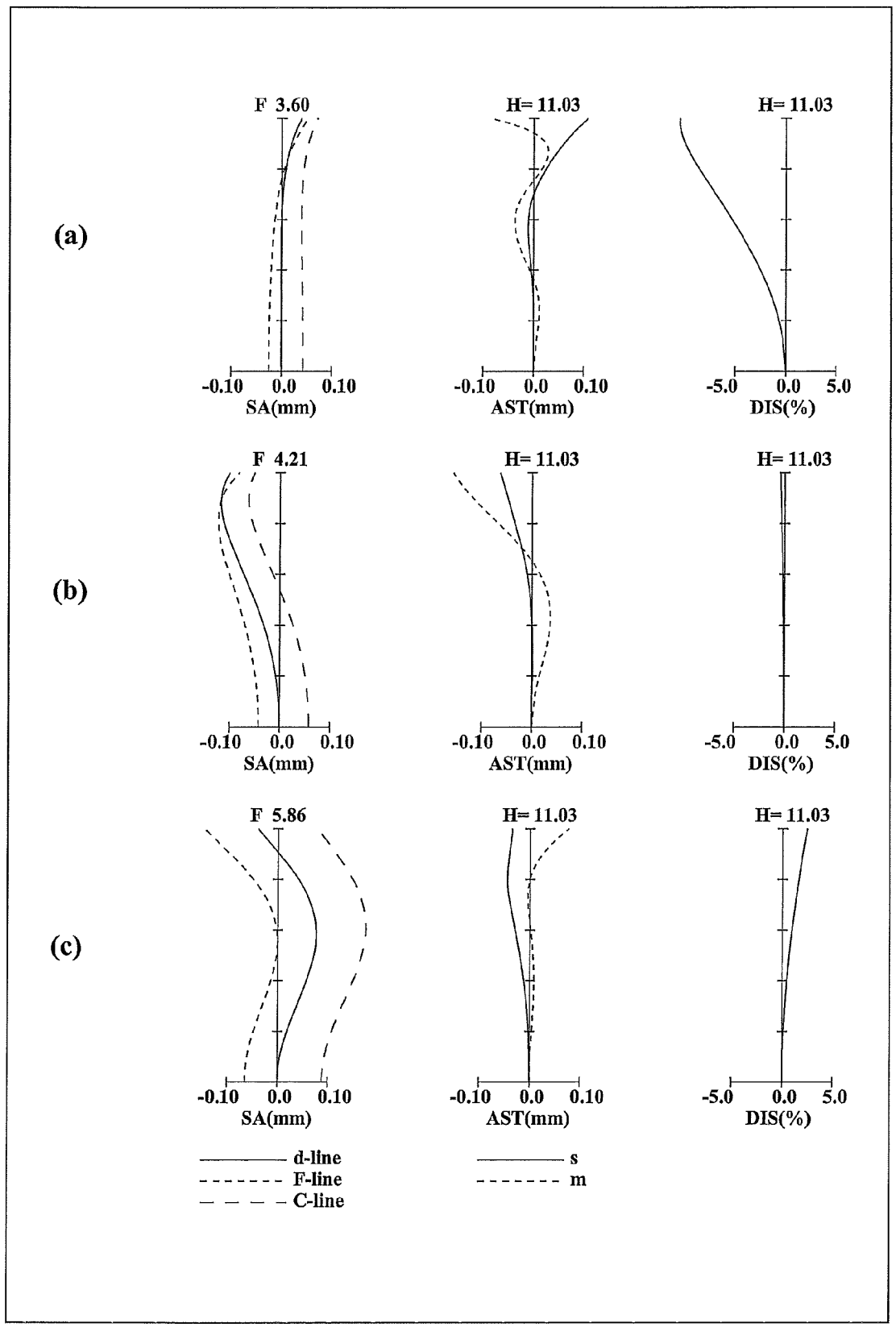
FIG. 27 is a longitudinal aberration diagram showing a close-point in-focus condition of a zoom lens system according to Example 7.
Figure 28:
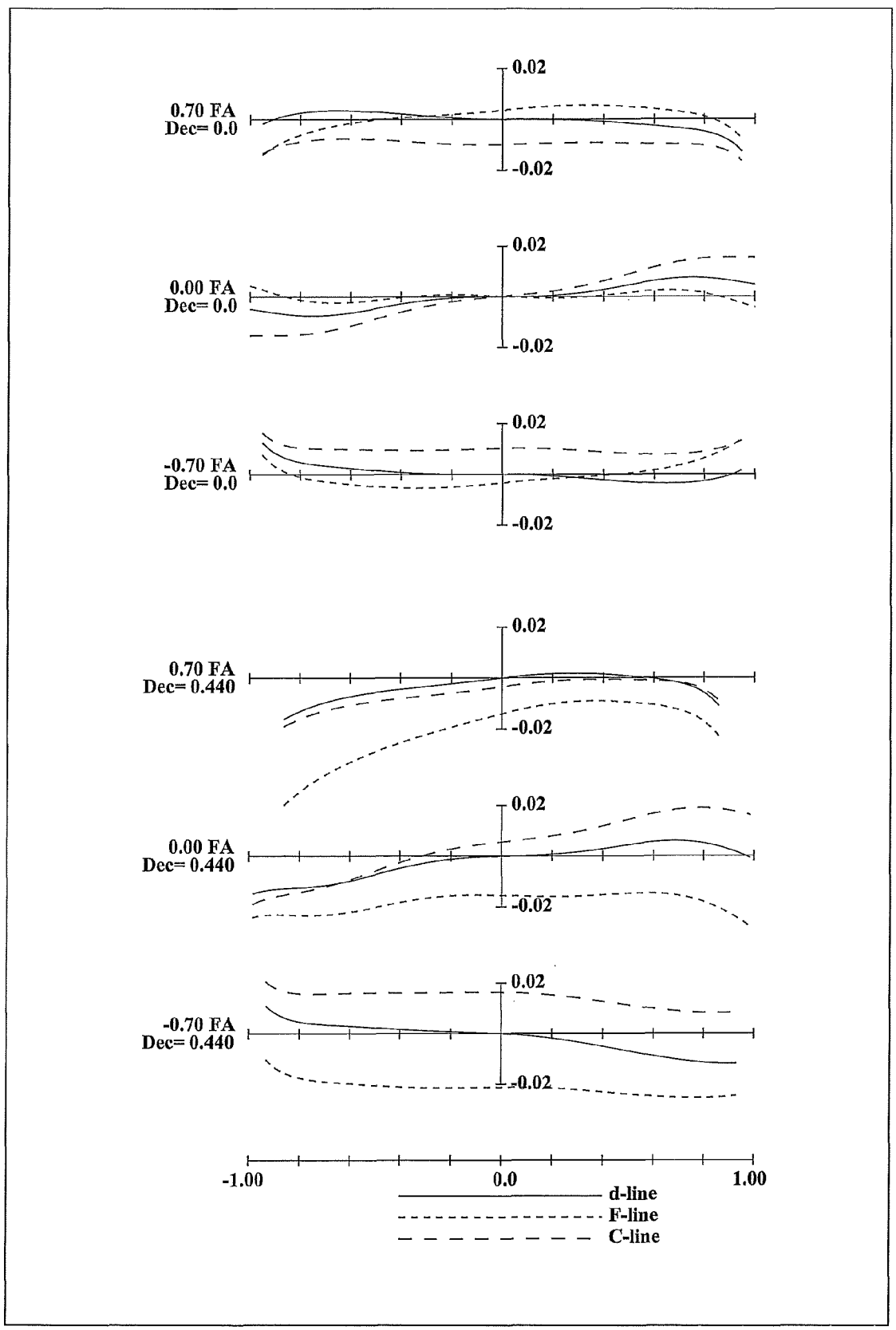
FIG. 28 is a lateral aberration diagram in a basic state where image blur compensation is not performed and in an image blur compensation state at a telephoto limit of a zoom lens system according to Example 7.

The zoom lens system of Numerical Example 7 corresponds to Embodiment 7 shown in FIG. 25. The data of the zoom lens system according to Numerical Example 7 is shown in the following tables.

TABLE 15

(surface data)

| Surface number | r          | d        | nd      | vd   |
|----------------|------------|----------|---------|------|
| Object surface | ∞          | Variable |         |      |
| 1              | 82.85600   | 1.20000  | 1.84666 | 23.8 |
| 2              | 61.48560   | 9.13460  | 1.49700 | 81.6 |
| 3              | −2787.80860| 0.20000  |         |      |
| 4              | 49.43870   | 6.71990  | 1.49700 | 81.6 |
| 5              | 110.76750  | Variable |         |      |
| 6              | 30.95520   | 0.80000  | 1.88267 | 40.8 |
| 7              | 10.98510   | 5.70370  |         |      |
| 8*             | −62.02010  | 1.20000  | 1.85976 | 40.5 |
| 9              | 42.27070   | 0.10290  |         |      |
| 10             | 20.41600   | 2.80850  | 1.92286 | 20.9 |
| 11             | 126.26210  | Variable |         |      |
| 12             | −79.87880  | 1.52840  | 1.92286 | 20.9 |
| 13             | −30.93440  | 0.59470  |         |      |
| 14             | −18.98130  | 0.80000  | 1.88287 | 40.8 |
| 15             | 44.94670   | 1.35130  | 1.92286 | 20.9 |
| 16*            | 138.81620  | Variable | a       |      |
| 17 (Aperture)  | ∞          | 1.50000  |         |      |
| 18             | 26.19950   | 1.98620  | 1.81231 | 45.2 |
| 19             | −980.82960 | 0.10000  |         |      |
| 20             | 24.81860   | 2.05170  | 1.66588 | 58.4 |
| 21             | −869.28790 | 2.59320  |         |      |
| 22             | −45.80690  | 0.80000  | 1.92286 | 20.9 |
| 23             | 46.31110   | 0.10000  |         |      |
| 24             | 30.60210   | 2.11400  | 1.49700 | 81.6 |
| 25             | −54.37230  | 2.95370  |         |      |
| 26*            | 54.72500   | 0.80000  | 1.74728 | 51.2 |
| 27             | 31.33230   | 2.35990  | 1.56650 | 69.0 |
| 28             | −26.99190  | Variable |         |      |
| 29             | −56.63870  | 1.33670  | 1.84666 | 23.8 |
| 30             | −28.85260  | 0.80000  | 1.81159 | 45.3 |
| 31*            | 109.74970  | Variable |         |      |
| 32             | 77.53990   | 2.08690  | 1.62538 | 35.6 |
| 33             | −38.55300  | 0.89750  |         |      |
| 34             | −17.33640  | 0.80000  | 1.88289 | 40.8 |
| 35             | −68.31790  | 0.10000  |         |      |
| 36             | 41.63170   | 1.65490  | 1.65233 | 32.6 |
| 37             | 214.46340  | Variable |         |      |
| 38             | ∞          | 4.20000  | 1.51680 | 64.2 |
| 39             | ∞          | BF       |         |      |
| Image surface  | ∞          |          |         |      |

TABLE 16

(aspherical data)

| Surface No. | Parameters |
|-------------|------------|
| 8  | K = 0.00000E+00, A4 = −1.55711E−05, A6 = 5.12022E−08, A8 = −2.29523E−09, A10 = 1.12839E−11 |
| 16 | K = 0.00000E+00, A4 = −1.02230E−05, A6 = 2.34863E−08, A8 = −1.21507E−09, A10 = 2.21100E−11 |
| 26 | K = 0.00000E+00, A4 = −6.08663E−05, A6 = −1.02979E−07, A8 = −1.95916E−10, A10 = 6.57580E−12 |
| 31 | K = 0.00000E+00, A4 = −1.20760E−05, A6 = −2.63940E−07, A8 = 7.32088E−09, A10 = −8.30305E−11 |

TABLE 17-1

(various data)
Zooming ratio 9.39665

|                         | Wide     | Middle   | Telephoto |
|-------------------------|----------|----------|-----------|
| Focal length            | 14.4195  | 45.8042  | 145.4801  |
| F number                | 3.60057  | 4.19379  | 5.80043   |
| View angle              | 40.4346  | 13.5612  | 4.2125    |
| Image height            | 11.0300  | 11.0300  | 11.0300   |
| Overall length of lens system | 100.6138 | 130.7860 | 164.5049 |
| BF                      | 1.00676  | 1.07461  | 0.98186   |
| d0                      | ∞        | ∞        | ∞         |
| d5                      | 1.0000   | 30.6930  | 56.5691   |
| d11                     | 3.7603   | 2.8658   | 2.0000    |
| d16                     | 15.1769  | 4.8771   | 1.5000    |
| d28                     | 2.0675   | 7.3071   | 1.0000    |
| d31                     | 5.0503   | 2.6335   | 15.6147   |
| d37                     | 11.1733  | 19.9562  | 25.4605   |

TABLE 17-2

(various data)

|                         | Wide     | Middle   | Telephoto |
|-------------------------|----------|----------|-----------|
| Focal length            | 14.4013  | 45.3347  | 135.4949  |
| F number                | 3.60094  | 4.20803  | 5.85992   |
| View angle              | 40.5080  | 13.5842  | 4.1940    |
| Image height            | 11.0300  | 11.0300  | 11.0300   |
| Overall length of lens system | 100.6170 | 130.8113 | 164.4475 |
| BF                      | 1.00193  | 1.09928  | 0.95442   |
| d0                      | 3884.0557| 3864.6948| 3845.7762 |

TABLE 17-2-continued (various data)

|  | Wide | Middle | Telephoto |
|---|---|---|---|
| d5 | 1.0000 | 30.6930 | 56.5691 |
| d11 | 3.7603 | 2.8658 | 2.0000 |
| d16 | 15.1769 | 4.8771 | 1.5000 |
| d28 | 2.1059 | 7.5949 | 2.6531 |
| d31 | 5.0200 | 2.3463 | 13.9317 |
| d37 | 11.1733 | 19.9562 | 25.4605 |

The following Tables show values corresponding to the individual conditions in the zoom lens systems of the numerical examples.

TABLE 18

(corresponding values to individual conditions: Numerical Examples 1 to 4)

| | Numerical Example | | | |
|---|---|---|---|---|
| Condition | 1 | 2 | 3 | 4 |
| (1) $|f_{BAK}/f_F|/(f_T/f_W)$ | 2.015 | 0.644 | 0.321 | 0.139 |
| (2) $|f_{BAK}/f_F|/f_W$ | 0.229 | 0.068 | 0.037 | 0.016 |
| (3) $|f_F/f_{of}|$ | 0.577 | 0.674 | 1.279 | 1.847 |
| (4) $|f_O/f_W|$ | 0.800 | 0.756 | 0.747 | 2.213 |

TABLE 19

(corresponding values to individual conditions: Numerical Examples 5 to 7)

| | Numerical Example | | |
|---|---|---|---|
| Condition | 5 | 6 | 7 |
| (1) $|f_{BAK}/f_F|/(f_T/f_W)$ | 1.438 | 0.166 | 14.232 |
| (2) $|f_{BAK}/f_F|/f_W$ | 0.130 | 0.019 | 9.958 |
| (3) $|f_F/f_{of}|$ | 0.480 | 1.970 | 2.490 |
| (4) $|f_O/f_W|$ | 0.729 | 1.752 | 2.051 |

The zoom lens system according to the present invention is applicable to a digital input device such as a digital still camera, a digital video camera, a mobile telephone, a PDA (Personal Digital Assistance), a surveillance camera in a surveillance system, a Web camera or a vehicle-mounted camera. In particular, the present zoom lens system is suitable for an imaging device in a digital still camera, a digital video camera or the like that requires high image quality.

Details of the present invention have been described above. However, the above-mentioned description is completely illustrative from every point of view, and does not limit the scope of the present invention. Obviously, various improvements and modifications can be performed without departing from the scope of the present invention.

What is claimed is:

1. A zoom lens system, in order from an object side to an image side, comprising:
a first lens unit having positive optical power;
a second lens unit having negative optical power; and
at least two subsequent lens units, wherein
at the time of zooming, all lens units move in a direction along the optical axis so that intervals between the lens units vary,
at the time of focusing, a second most image-side lens unit is a focusing lens unit and moves in direction along the optical axis, and a lens unit arranged just on the object side relative to the focusing lens unit has positive optical power, wherein $$0.10 \text{ mm}^{-1} < |f_{BAK}/f_F|/f_W < 15.0 \text{ mm}^{-1} \quad (2)$$

$f_T/f_W > 4$ where, $f_{BAK}$ is a composite focal length of the lens units arranged on the image side relative to the focusing lens unit at a wide-angle limit, $f_F$ is a focal length of the focusing lens unit, $f_T$ is a focal length of the zoom lens system at a telephoto limit, and $f_W$ is a focal length of the zoom lens system at a wide-angle limit.

2. The zoom lens system as claimed in claim 1, wherein a third lens unit is a lens unit which is positioned just on the image side relative to the second lens unit and is positioned on the most object side among the at least two subsequent lens units, and either an entirety of a third lens unit or a part of the second lens unit is an image blur compensation lens unit and moves in a direction perpendicular to the optical axis at the time of compensating image blur caused by vibration in the zoom lens system.

3. The zoom lens system as claimed in claim 2, satisfying the following condition:

$$0.3 < |f_F/f_{of}| < 6.0 \quad (3)$$

where, $f_F$ is a focal length of the focusing lens unit, and $f_{of}$ is a composite focal length of the lens units located within a range from the image blur compensation lens unit to the focusing lens unit at a wide-angle limit.

4. The zoom lens system as claimed in claim 2, satisfying the following condition:

$$0.5 < |f_o/f_W| < 2.8$$

where $f_o$ is a focal length of the image blur compensation lens unit.

5. The zoom lens system as claimed in claim 1, satisfying the following condition:

$$0.10 < |f_{BAK}/f_F|/(f_T/f_W) < 15.0 \quad (1)$$

$\omega_W < 20°$ where, $\omega_W$ is a half view angle at a wide-angle limit.

6. An interchangeable lens apparatus comprising:
a zoom lens system; and
a camera mount section connected to a camera body provided with an image sensor for receiving an optical image formed by the zoom lens system and then converting the optical image into an electric image signal, wherein the zoom lens system, in order from an object side to an image side, comprises:
a first lens unit having positive optical power;
a second lens unit having negative optical power; and
at least two subsequent lens units, wherein
at the time of zooming, all lens units move in a direction along an optical axis so that intervals between the lens units vary,
at the time of focusing, a second most image-side lens unit is a focusing lens unit and moves in a direction along the optical axis, and a lens unit arranged just on the object side relative to the focusing lens unit has positive optical power, wherein $$0.10\ mm^{-1} < |f_{BAK}/f_F|/f_W < 15.0\ mm^{-1} \quad (2)$$

$f_T/f_W > 4$ where, $f_{BAK}$ is a composite focal length of the lens units arranged on the image side relative to the focusing lens unit at a wide-angle limit, $f_F$ is a focal length of the focusing lens unit, $f_T$ is a focal length of the zoom lens system at a telephoto limit, and $f_W$ is a focal length of the zoom lens system at a wide-angle limit.

7. A camera system comprising:

an interchangeable lens apparatus that includes a zoom lens system; and a camera body that is connected to the interchangeable lens apparatus via a camera mount section in an attachable and detachable manner and that includes an image sensor for receiving an optical image formed by the zoom lens system and then converting the optical image into an electric image signal, wherein the zoom lens system, in order from an object side to an image side, comprises:

a first lens unit having positive optical power;

a second lens unit having negative optical power; and at least two subsequent lens units, wherein at the time of zooming, all lens units move in a direction along an optical axis so that intervals between the lens units vary, at the time of focusing, a second most image-side lens unit is a focusing lens unit and moves in a direction along the optical axis, and a lens unit arranged just on the object side relative to the focusing lens unit has positive optical power, wherein $$0.10\ mm^{-1} < |f_{BAK}/f_F|/f_W < 15.0\ mm^{-1} \quad (2)$$

$f_T/f_W > 4$ where, $F_{BAK}$ is a composite focal length of the lens units arranged on the image side relative to the focusing lens unit at a wide-angle limit, $f_F$ is a focal length of the focusing lens unit, $f_T$ is a focal length of the zoom lens system at a telephoto limit, and $f_W$ is a focal length of the zoom lens system at a wide-angle limit.

* * * * *